(12) United States Patent
Mathur et al.

(10) Patent No.: US 8,726,010 B2
(45) Date of Patent: May 13, 2014

(54) SECURE CONTENT DISTRIBUTION

(75) Inventors: Priyadarshee Deeptarag Mathur, Chanhassen, MN (US); Robert J. Reutiman, Hopkins, MN (US); Samir Mittal, Eden Prairie, MN (US)

(73) Assignee: Qumu Corporation, Minneapolis, MN (US)

( * ) Notice: Subject to any disclaimer, the term of this patent is extended or adjusted under 35 U.S.C. 154(b) by 112 days.

(21) Appl. No.: 13/279,009

(22) Filed: Oct. 21, 2011

(65) Prior Publication Data

US 2012/0102317 A1 Apr. 26, 2012

Related U.S. Application Data

(60) Provisional application No. 61/405,506, filed on Oct. 21, 2010, provisional application No. 61/405,499, filed on Oct. 21, 2010.

(51) Int. Cl.
*H04L 29/06* (2006.01)

(52) U.S. Cl.
USPC ......................................... 713/156; 713/150

(58) Field of Classification Search
USPC ................................. 713/150, 156
See application file for complete search history.

(56) References Cited

U.S. PATENT DOCUMENTS

| | | | |
|---|---|---|---|
| 6,529,894 B1 * | 3/2003 | Haeri et al. ........................... 1/1 |
| 6,772,340 B1 * | 8/2004 | Peinado et al. ................ 713/168 |
| 7,158,953 B1 * | 1/2007 | DeMello et al. ................. 705/51 |
| 7,555,464 B2 | 6/2009 | Candelore |
| 7,568,003 B2 | 7/2009 | Zhang et al. |
| 7,916,322 B2 | 3/2011 | Pineau |
| 2003/0032409 A1 | 2/2003 | Hutcheson et al. |
| 2003/0046240 A1 | 3/2003 | Stone et al. |
| 2004/0032393 A1 | 2/2004 | Brandenberg et al. |
| 2005/0114672 A1 | 5/2005 | Duncan et al. |
| 2005/0240558 A1 | 10/2005 | Gil et al. |
| 2006/0230145 A1 * | 10/2006 | Zarakhovsky et al. ........ 709/225 |
| 2008/0178001 A1 * | 7/2008 | Kim et al. ...................... 713/167 |
| 2009/0007240 A1 * | 1/2009 | Vantalon et al. .................. 726/4 |
| 2009/0097827 A1 * | 4/2009 | Park et al. ...................... 386/124 |
| 2009/0210923 A1 * | 8/2009 | Jogand-Coulomb ............. 726/1 |
| 2010/0071030 A1 | 3/2010 | Rosenan et al. |

(Continued)

FOREIGN PATENT DOCUMENTS

| | | |
|---|---|---|
| CN | 101729562 | 6/2010 |
| EP | 15131379 | 2/1996 |

(Continued)

OTHER PUBLICATIONS

International Search Report and Written Opinion dated May 24, 2012 as received in application No. PCT/US2011/057391.

*Primary Examiner* — Amir Alavi
*Assistant Examiner* — Tracy Mangialaschi
(74) *Attorney, Agent, or Firm* — Maschoff Brennan

(57) ABSTRACT

In an example, a method of securing content is described. The method may include instantiating a content server on a client device. The method may also include operating the content server to retrieve content identified by a Uniform Resource Identifier (URI). The method may also include serving the content from the content server to a content renderer on the client device. The content renderer may be configured to render the content at the client device and to prohibit saving the content in the clear on the client device.

20 Claims, 11 Drawing Sheets

(56) References Cited

U.S. PATENT DOCUMENTS

| | | |
|---|---|---|
| 2010/0094878 A1 | 4/2010 | Soroca et al. |
| 2010/0115253 A1 | 5/2010 | Lipsky et al. |
| 2010/0205677 A1 | 8/2010 | Kawamoto et al. |
| 2010/0268772 A1 | 10/2010 | Romanek et al. |
| 2010/0268950 A1 | 10/2010 | Qu et al. |
| 2010/0293244 A1 | 11/2010 | Zhu |
| 2010/0293594 A1 | 11/2010 | Goh et al. |
| 2010/0325051 A1* | 12/2010 | Etchegoyen .................. 705/54 |
| 2011/0029628 A1 | 2/2011 | Haffner |
| 2011/0030065 A1* | 2/2011 | Kulakowski .................. 726/26 |
| 2011/0035431 A1 | 2/2011 | Geary et al. |
| 2011/0066652 A1 | 3/2011 | Piepenbrink et al. |
| 2011/0066730 A1 | 3/2011 | Julia et al. |
| 2011/0093929 A1 | 4/2011 | Li et al. |

FOREIGN PATENT DOCUMENTS

| | | |
|---|---|---|
| EP | 2284645 | 2/2011 |
| JP | 2007-201685 A | 8/2007 |
| KR | 10-2008-0035875 A | 4/2008 |
| KR | 10-2008-0035940 A | 4/2008 |
| WO | 2010041104 | 4/2010 |
| WO | 2011006738 | 1/2011 |
| WO | 2011011441 | 1/2011 |

* cited by examiner

SECURE CONTENT DISTRIBUTION

CROSS-REFERENCE TO RELATED APPLICATIONS

The present application claims the benefit of and priority to U.S. Provisional Application No. 61/405,506, filed Oct. 21, 2010 and entitled CONTENT AGGREGATION AND ANALYTICS and U.S. Provisional Application No. 61/405,499, filed Oct. 21, 2010 and entitled SECURE CONTENT DISTRIBUTION. Each of the foregoing patent applications is herein incorporated by reference in its entirety.

BACKGROUND

1. Field of the Invention

The present invention generally relates to content distribution. More particularly, some example embodiments relate to secure content publishing and licensing.

2. Related Technology

Digital rights management (DRM) refers to access control technologies used by some hardware manufacturers, content publishers, copyright holders or others to control use of digital content. DRM is generally used to describe any technology that inhibits use of the digital content that is not desired or intended by the content provider.

In some DRM implementations, the ability to control distribution is tied to the content itself and content providers may require a consumer to authenticate using a username and password to gain access to the content. Usernames and passwords can be forgotten, compromised or shared, limiting the effectiveness of such DRM implementations.

Alternately or additionally, some DRM implementations may be largely limited to audio and video content, on captive formats, on captive platforms, and/or with captive and cumbersome software development kits (SDKs). These factors may necessarily limit the types of content that may be distributed and/or the size of the audience that can be reached for such content.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Techniques described herein generally relate to secure content publishing and licensing.

In an example embodiment, a method of securing content is described. The method may include instantiating a content server on a client device. The method may also include operating the content server to retrieve content identified by a Uniform Resource Identifier (URI). The method may also include serving the content from the content server to a content renderer on the client device. The content renderer may be configured to render the content at the client device and to prohibit saving the content in the clear on the client device.

In another example embodiment, a method of subscribing to content from one or more publishers is described. The method may include registering a client device with a secure publishing system. Registering may include providing a hardware fingerprint of the client device to the secure publishing system. Registering may also include creating a private key and a corresponding public key at the client device and sending the public key to the secure publishing system. Registering may also include receiving a license number from the secure publishing system at the client device. The license number may be generated by the secure publishing system and may be configured to uniquely identify the client device. The method may also include subscribing to a content channel served by the secure publishing system, including providing the license number and a channel identifier corresponding to the content channel to the secure publishing system.

In yet another example embodiment, a method of aggregating content metrics is described. The method may include providing content to a client device. The method may also include providing a policy to the client device that governs consumption of the content by the client device. The method may also include collecting content metrics associated with at least one of providing the content or consumption of the content. The method may also include analyzing the content metrics for at least one of fraud detection or content piracy reduction.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
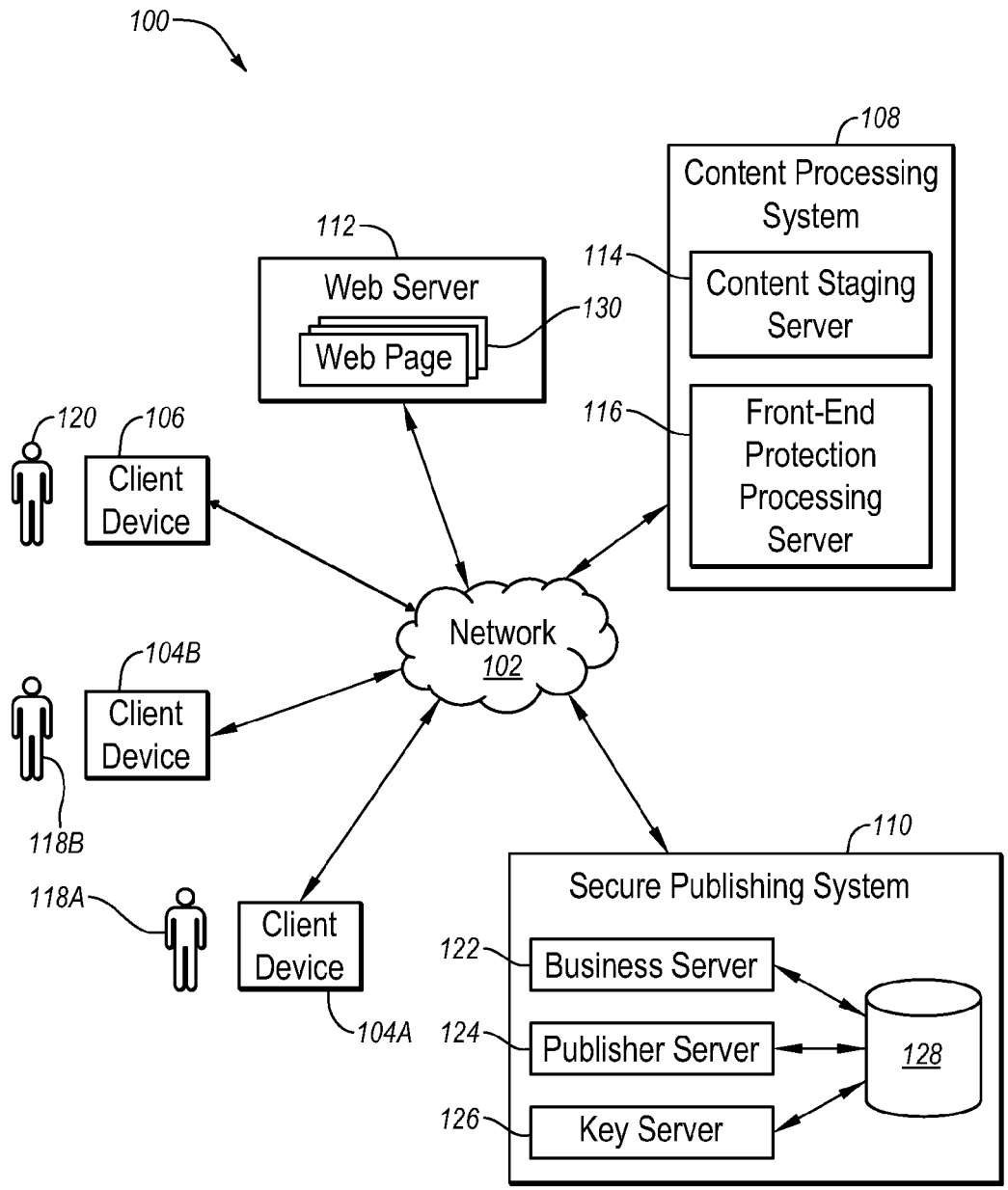
FIG. 1 illustrates an example operating environment in which some embodiments may be implemented.

Embodiments disclosed herein relate generally to systems and methods for secure content distribution. More specifically, example embodiments relate to systems and methods for enabling offline content security and/or content licensing in devices with intermittent network connectivity. Some embodiments described herein may enable the secure distribution and/or licensing of content to mobile devices or other devices, secure progressive downloads with offline content storage, enforcing conditional access with multiple content renderers, secure distribution of content to closed and/or open workgroups, and/or aggregating content analytics for fraud detection and content piracy reduction.

Content can include, but is not limited to, video data, audio data, documents, text, images, web pages, or other content or the like or any combination thereof. Examples include, by way of example only, generic content types including, but not limited to, text, PDF, HTML, spreadsheets, audio and video, and images. The content may include subscription-based content, which can be updated or added to over time. The content can be maintained or expressed in multiple formats. In one example, certain content may include a set of files (which may be in different formats) that can be logically grouped together. In addition, the content can be available both online and/or offline. Although some embodiments are discussed with respect to consumers and publishers, the described embodiments can be implemented on devices and/or servers associated with the consumers and/or publishers and/or other entities.

A consumer of content may be referred to as an entity (or associated device/server/computing device) that can use the content in accordance with policies that are usually set by the publisher of the content. In effect, the consumer licenses the content and the terms of the license are reflected in the policies associated with the content. The license can thus be a purchase of the content, time restricted use of the content, specific-use of the content (view, play, copy, print, etc.), or the like. The user or consumer of content can be a single user, a group of users (that may or may not be related), a business, a domain, or the like or any combination thereof. A consumer may have multiple devices on which the content can be consumed (e.g., viewed, heard, read, shared, transmitted, printed, recorded, etc.). Embodiments further relate to on-going content delivery For example, the content may include subscription-based content.

Content is usually generated or maintained by a publisher or an owner of the content. Embodiments disclosed herein enable a publisher to distribute content to multiple consumers, in multiple formats or types. A publisher may be able to provide content once while allowing multiple uses of the content. More specifically, the publisher can provide the content. The content can then be converted to a wide variety of different formats. Policies may also be established that govern the consumption of the content. A publisher can create many different policies for the same content. The different policies may be associated with different uses of the content.

For example, one consumer may purchase a license that allows for use of the content during a specified time. Another consumer may purchase the same content for a different use. As described in more detail herein, these consumers have different policies that impact how the content is consumed. In this sense, a publisher can provide the content once and then allow multiple uses according to different policies. In addition, the publisher may have the ability to update, alter, change, replace, exchange, delete, etc., the policies to change current and/or future consumption of the content. In addition, the publisher or other entity may have the ability to license portions of the content in a similar manner.

Some embodiments further relate to analytics and/or the generation of analytics related to the distributed content. The content analytics may allow the publisher to detect fraud and/or to reduce content piracy. The analytics can be derived from the information received from or collected from the devices that consume the content. In some instances, the aggregated content may also include data related to content that was browsed or reviewed or searched, but not licensed.

The aggregated content, which includes information related to consumption of the distributed content, can be used for targeted marketing across platforms. The information can also be used to generate revenue. The consumption of the content can be used to target specific advertisements to specific consumers. In addition, demographics such as demographics of consumers (when provided), types of devices, types of content, and the like can be collected and used to generate analytics. Additional data that can be used in aggregated content includes content viewing.

The aggregated content can be used to determine a value of the content and/or to rank the content. For example, information indicating that content is viewed or consumed more frequently than other content is information that may be used by the publisher to rank the corresponding content. More frequently viewed or consumed content may be ranked higher than other less consumed content. This information may also be used for monetization purposes. For example, the collected information may be used to determine price points for different and/or similar content and/or for the same content.

In some embodiments, the publisher may receive the aggregated content and generate the analytics itself. Alternately or additionally, the publisher may use a service to collect and/or analyze the aggregated content. The distribution framework disclosed herein also enables the publisher to control how the analytics are used, how the analytics are generated, and the like.

As a result, the publisher has a greater ability to benefit from the content being distributed and may not be reliant on another entity (e.g., a general portal) in some embodiments. In addition, the distribution disclosed herein may secure the content and can thus generate analytics on secured content—rather than content that is in the clear. Also, the publisher can benefit from any revenue generated from use of the aggregated content.

In another example, the analytics can be used predictively. For example, the publisher may determine that certain consumers are likely to consume certain content. That content can then be downloaded to the consumer's devices and cached. Should the consumer want to consume that content, the user does not have to wait for the download to occur because the content is already cached on the consumer's device. The consumer, however, may need to purchase a license to the content, although this can be automated such that the consumer, when opening certain content, also agrees to certain licenses.

In some embodiments, the distribution of the content as well as the consumption of the content relies on keys. The keys may be related to the consumer's devices. As a result, the ability to control distribution may not be tied to the file itself (like conventional DRM systems) but may be tied to the devices. This enables content to be distributed anonymously without the use of passwords, email addresses, etc. In other embodiments, a publisher may nevertheless require consumers to enter passwords, email addresses, or other consumer-identifying information for other reasons.

Generally, it is assumed that protected content can be freely downloaded or copied between devices. In some embodiments, however, the distribution of the content is utilized to provide for licensing and monetization of that content by consumers. Even though the content can be freely copied, consumption of the content may be tied to specific devices. As a result, unauthorized devices may be unable to consume the content unless an appropriate license is purchased.

Some embodiments support multi-tiered policies on how the content can be consumed. By way of example only and not limitation, the polices can define or be related to: permissions to view or otherwise consume the content for a specified duration; permissions to view or otherwise consume the content between a range of dates and times; limits on the number of devices that a consumer can use to view or otherwise consume the content; and the ability to print, annotate or just view the content.

For example, a consumer may subscribe to reference documents and tutorials for a licensed technology. The consumer obtains the most recent release of the content and decides to go on the publisher's website to buy a license to consume (e.g., view) the content for a period of time. This license may also include the right to receive updates to the content. In this case, updates are automatically delivered to the consumer and are also consumable in accordance with the purchased license. Once the licensing period is over, however, the original content and the subsequent updates are no longer consumable.

In another example, a consumer may subscribe to rich media content. The publisher periodically "pushes" the content to the consumer's device and may notify the consumer that new content is available for purchase. A portion of the content may be viewable without restrictions, and the consumer may be directed to the publisher's website to license the content in its entirety. The license terms would dictate if the consumer would be able to view the content forever, between certain dates and times, or for some number of days or the like.

The foregoing examples illustrate that there are at least two aspects in securing the content and/or the delivery of the content. One aspect includes encrypting the content itself. Another aspect is to secure the devices owned by the consumer so that policies associated with the content can be enforced.

Securing the devices can ensure that authorized consumers or devices are authenticated. In one example, the keys to unlock the content are delivered directly to the target device, without making the consumer be responsible for cutting/pasting long key strings or managing passwords. Similarly, a publisher may not have to embed passwords on a per-license basis, or even have to manage passwords at all. From a publisher's perspective, the secure delivery framework disclosed herein can accept the licensing and monetization policies and deal automatically (and possibly anonymously) with the consumers of the content. In one example, this is achieved because the content and the distribution and the consumption of the content is tied to the device and not necessarily to the content itself.

In contrast to these and other embodiments described herein, conventional DRM deployment is largely limited to audio and video content, on captive formats, on captive platforms, and/or with captive and cumbersome software development kits (SDKs).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 illustrates an example operating environment 100 in which some embodiments may be implemented. In the illustrated embodiment, the operating environment 100 includes a network 102, one or more client devices 104A, 104B, 106, a content processing system 108, a secure publishing system 110, and a web server 112.

The network 102 may be configured to communicatively connect the various components within the operating environment 100 together. In these and other embodiments, the network 102 may include the Internet, including a global internetwork formed by logical and physical connections between multiple wide area networks and/or local area networks. Alternately or additionally, the network 102 includes one or more cellular RF networks and/or one or more wired and/or wireless networks such as, but not limited to, 802.xx networks, Bluetooth access points, wireless access points, IP-based networks, or the like. The network 102 can also include servers that enable one type of network to interface with another type of network.

Each of the client devices 104A, 104B may be associated with a corresponding consumer 118A, 118B, while the client device 106 may be associated with a publisher 120. While the publisher 120 is illustrated as a single individual, more generally, the publisher 120 may include one or more individuals, such as employees, of the publisher. Each of the client devices 104A, 104B, 106 may include, but is not limited to, a desktop computer, a laptop computer, a mobile phone, a smartphone, a personal digital assistant (PDA), or other suitable client device. Moreover, each of the client devices 104A, 104B, 106 may have an intermittent connection to the network 102 in some embodiments.

Each of the client devices 104A, 104B associated with consumers 118A, 118B may execute a content renderer (not shown) to render content at the client device 104A, 104B. The content may be received from, e.g., the secure publishing system 110. In general, the content renderer may be configured to prohibit saving the content in the clear on the client device 104A, 104B. Alternately or additionally, each of the client devices 104A, 104B may execute an application (not shown) configured to communicate through the network 102 with one or more of the secure publishing system 110 or the web server 112.

The client device 106 associated with the publisher 120 may execute a browser or other application (not shown) configured to communicate through the network 102 with one or more of the web server 112, content processing system 108, or secure publishing system 110.

The content processing system 108 may be configured to process content for publication and may include a content staging server 114 and front-end protection processing server 116. Additional details regarding the content processing system 108 according to some example embodiments are provided below.

The secure publishing system 110 may be configured to publish content processed by the content processing system 108 in a secure manner to prevent unauthorized use of the content. The secure publishing system 110 may include a business server 122, a publisher server 124, a key server 126 and storage 128. In some embodiments, content processed by content processing system 108 may be uploaded to the secure publishing system 110 and saved in the storage 128. Alternately or additionally, the storage 128 may include a database of media keys and locators associated with the content and/or unique identifiers and public keys associated with client devices 104A, 104B. Some or all of the secure publishing system 110 may be hosted by the publisher 120, or more particularly by a server or servers owned or rented by the publisher 120. Alternately or additionally, some or all of the secure publishing system 110 may be rented by the publisher 120 and deployed in a Software-as-a-Service (SaaS) environment such as a cloud computing environment. Additional details regarding the secure publishing system 110 according to some example embodiments are provided below.

The web server 112 may be configured to provide access to a website of the publisher 120 to the client devices 104A, 104B, the publisher's website including one or more web pages 130. More specifically, the web server 112 may be configured to accept Hypertext Transfer Protocol (HTTP) requests and/or HTTP Secure (HTTPS) requests from client devices 104A, 104B and/or to serve the client devices 104A, 104B HTTP responses or HTTPS responses along with optional data contents, which can include Hypertext Markup Language (HTML) documents such as web pages 130 and linked objects for display to the consumers 118A, 118B on client devices 104A, 104B. Alternately or additionally, the web server 112 may be configured to communicate with the secure publishing system 110 through the network 102.

In some embodiments, one or more of the web pages 130 may include a software package, or a link to the software package, that can be downloaded to client devices 104A, 104B for receiving and/or rendering secure content from the secure publishing system 110 or other sources. Alternately or additionally, one or more of the web pages 130 may include content, or links to content, that can be downloaded or streamed to client devices 104A, 104B for consumption by consumers 118A, 118B.

Figure 2:
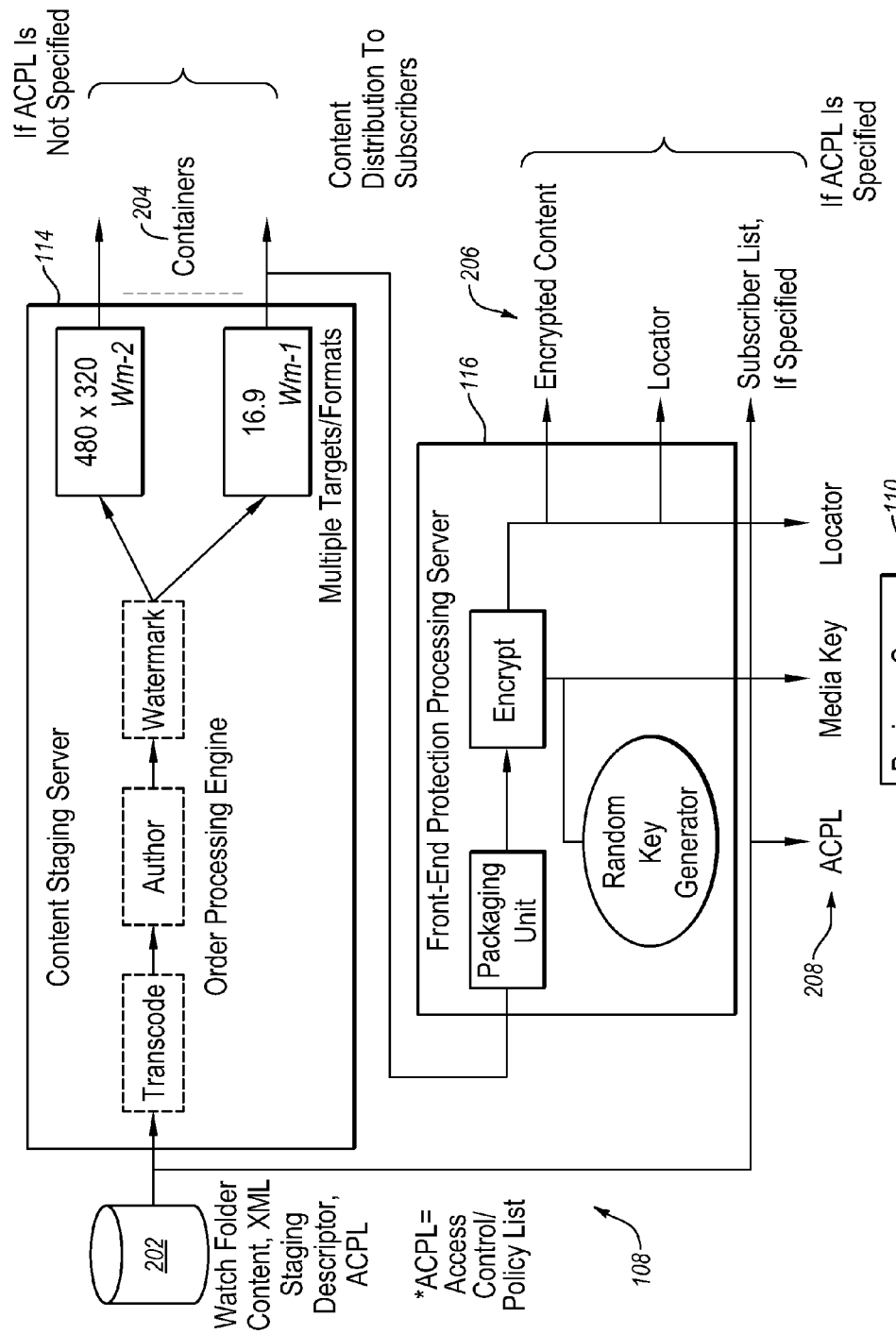
FIG. 2 shows an illustrative embodiment of a content processing system that may be included in the operating environment of FIG. 1.

FIG. 2 shows an illustrative example of the content processing system 108 of FIG. 1, including the content staging server 114 and the front-end protection processing server 116. With combined reference to FIGS. 1-2, the preparation of content 202 for distribution to client devices 104A, 104B can be performed using an appliance or a server. FIG. 2 thus illustrates the transformation and/or preparation of content 202 into a form that is suitable for distribution. The content 202, when ready for distribution, may be encrypted by and may be associated with one or more media keys. Each media key may be associated with certain content 202 and/or may be independent of the licenses or policies for the content 202. The media key and the license/policies may be delivered to the consumer together or separately. The publisher of the content 202 can specify the policies that apply to different consumers.

The content staging server 114 may be configured to transform raw content 202 into multiple formats or targets and for distribution to multiple consumers. In particular, the content staging server 114 may be configured to perform at least one of: transcoding, authoring, or watermarking of the content 202. The content 202 may then be provided in one or more forms or targets or formats. For example, video content may be transcoded into high definition video, standard definition video, or other form or other size. The targets may include video that is targeted to specific devices and display sizes.

Usually, each format of the content or target of the content can be included in a container 204. In some examples, the container 204 may include sub-containers. For instance, a document or other content having multiple pages or sections may include a sub-container for each page, each chapter, each section, etc. Containers 204 and sub-containers enable publishers to manage the distribution of specific portions of the content. Alternatively stated, the containers 204 and/or sub-containers also enable consumers to license specific portions of the content.

During processing by the content processing system 108, the publisher may also specify or identify access control and access policies (ACPL) that are associated with the content. Alternately or additionally, the ACPLs associated with the content may be specified or identified through the secure publishing system 110 (FIG. 1). The policies can determine how the content can be consumed. In some embodiments, policies may be provided in an XML format and processed by the content staging server 114. Alternately or additionally, content such as raw video footage or raw audio may be consolidated for distribution with simple navigation during authoring and watermarks added prior to distribution.

The publisher, via the appropriate servers and/or networks, may have a distribution mechanism, such as the secure publishing system 110, that delivers each (encrypted) target to its intended consumer 118A, 118B and client device 104A, 104B. In this sense, the publisher 120 provides the content a single time but enables multiple uses of the content. However, it is not assumed that the content will only be delivered to the intended recipients because consumers 104A, 104B might move content between devices outside of the distribution system (on a disc, or flash drive, for instance). Along with the policies on the content, the publisher 120 can optionally specify who the consumers of the content are and the specific policies that apply to consumers 118A, 118B and/or client devices 104A, 104B.

At the output of the content staging server 114, the content may be fed through the front-end protection processing server 116. The front-end protection processing server 116 may encrypt the content using a media key, generate a content locator (hereinafter "locator"), and prepare two streams of data 206, 208. The terms "first" and "second" are not used to indicate the order in which the two streams are generated in this example, but are merely used to distinguish between the two streams.

The first stream of data 206, which may include the encrypted content and its associated locator, may be uploaded to the secure publishing system 110 and may be suitable for distribution to consumers. In some embodiments, the first stream of data 206 is uploaded to the publisher server 124 of the secure publishing system 110 of FIG. 1.

The second stream of data 208, which may include the locator, the ACPL, and the media key to decrypt the encrypted content, may also be distributed to the secure publishing system 110. In some embodiments, the second stream of data 208 is provided to the business server 122 of the secure publishing system 110. The business server 122 may implement logic that determines which media key(s) each consumer (e.g., subscriber) 118A, 118B should own. The business server 122 or key server 126 may also distribute those media keys to the consumers 118A, 118B (preemptively when possible, or as a download when a consumer's client device 104A, 104B connects to the business server 122).

More specifically, the encrypted content can be distributed to the client devices 104A, 104B. However, each client device 104A, 104B may be unable to consume the content until the client device 104A, 104B receives the media key needed to decrypt the content and optionally the ACPL, if one is provided. At the client device 104A, 104B, the policies included in the ACPL can be enforced by components of the software package that are installed on the client device 104A, 104B.

Figure 3:
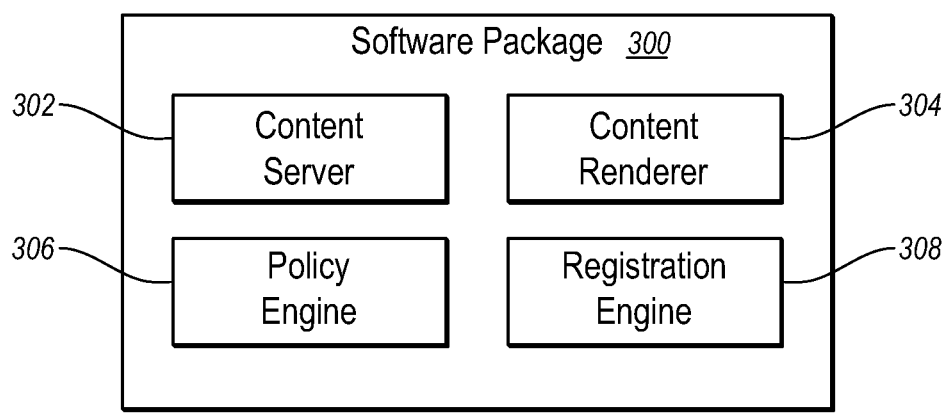
FIG. 3 illustrates an example software package that can be downloaded to a client device in the operating environment of FIG. 1.

FIG. 3 illustrates an example software package 300 that can be downloaded to a client device, such as the client devices 104A, 104B of FIG. 1. With combined reference to FIGS. 1-3, the software package 300 may be configured to receive and/or render secure content received from the secure publishing system 110 or other sources on a corresponding one of the client devices 104A, 104B (generically hereinafter "client device 104" or "client devices 104"). The software package 300 may include at least one of a content server 302, a content renderer 304, a policy engine 306, or a registration engine 308.

In general, the content server 302 may be configured to retrieve content identified by a Uniform Resource Identifier (URI), a Uniform Resource Locator (URL), or other locator and to serve the content to any secure content renderer, such as the content renderer 304. In some embodiments, the content server 302 is configured to prohibit serving the content to any client except a content renderer (or content renderers) on the client device 104 on which the content server 302 is installed. The content renderer on the client device 104 may be the content renderer 304 or some other content renderer. To ensure that content is only served to a client on the same client device 104 as the content server 302, the content server 302 may check to ensure the content renderer is connecting from a localhost socket to confirm that the content renderer resides on the same client device 104 as the content server 302. Alternately or additionally, the content server 302 may authenticate the content renderer using an authentication handshake. As an illustrative example of an authentication handshake, when the content renderer and the content server belong to the same process, a shared secret may be provided by the content server to the content renderer. The content renderer may then include the secret or a challenge response using the secret when it requests content using the URI, URL or other locator.

The content renderer 304 may be configured to render content received from the content server 302 or stored locally on the client device 104 on which the content renderer 304 is installed. In general, the content renderer 304 may be configured to render the content without allowing the content to be saved in the clear.

In some embodiments, the content provided to the content renderer 304 may include one or more associated policies that govern consumption of the content. The policies may be enforced by the content renderer 304. Alternately or additionally, the policies may be enforced by the policy engine 306 in some embodiments in which the content is provided to a generic or third-party content renderer.

The registration engine 308 may be configured to initiate a registration process between the client device on which the software package 300 is installed and the secure publishing system 110.

The specific components of the software package 300 downloaded to a client device may depend on the configuration of the client device. For instance, a client device such as a desktop computer may download at least one of the content renderer 304, the policy engine 306 or the registration engine 308 while omitting the content server 302. Alternately or additionally, a client device such as a smartphone or other mobile client device may download at least the content server 302 and optionally one or more of the content renderer 304, the policy engine 306 or the registration engine 308. Alternately or additionally, the entire software package 300 may be downloaded to each client device while any unnecessary components of the download are not installed and/or are inactivated.

Figure 4A:
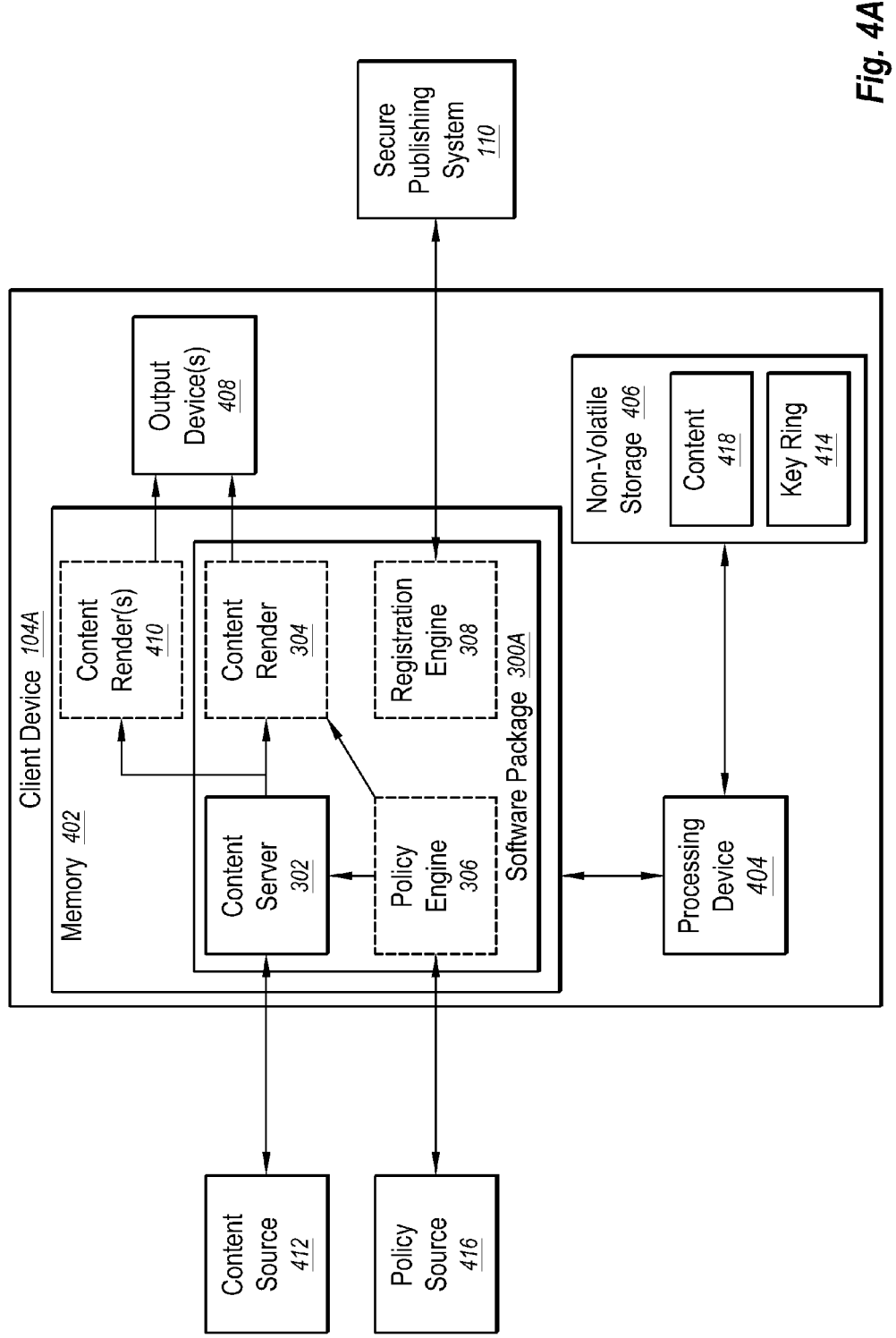
FIG. 4A illustrates an example embodiment of a client device implemented as a smartphone.

FIG. 4A illustrates an example embodiment of the client device 104A implemented as a mobile client device, such as a smartphone. Alternately, the client device 104A may be implemented as a desktop computer or other client device. In the illustrated embodiment, the client device 104A includes a memory 402, a processing device 404, a non-volatile storage 406, and one or more output devices 408. In general, software including computer instructions can be loaded into memory 402 from non-volatile storage 406 for execution by the processing device 404. For instance, in FIG. 4A, the client device 104A has downloaded and loaded into the memory 402 a software package 300A, which is an embodiment of the software package 300 of FIG. 3. The software package 300A includes the content server 302, and optionally one or more of the content renderer 304, the policy engine 306 and the registration engine 308. Alternately or additionally, the client device 104A may include one or more generic, third-party or native content renderer(s) 410.

While each of the content renderers 304, 410 is depicted by dashed lines in FIG. 4A as being optional, in general, the client device 104A may include at least one content renderer, whether it be the content renderer 304 included in the software package 300A or the generic, third-party or native content renderer 410. In some embodiments, the content renderer 304 and/or 410 included on the client device 104A may include a thread within a process or application running on the client device 104A. In these and other embodiments, the content renderer 304 and/or 410 may be launched on the client device 104A as a thread separate from the content server 302. Alternately or additionally, the content renderer 304 or 410 may be launched by loading a viewer library corresponding to the content renderer 304 or 410 on the client device 104A.

I. Secure Streaming

The content server 302 may be instantiated on the client device 104A to securely stream content to the client device 104A and/or to provide secure progressive download to the client device 104A. After the content server 302 is instantiated on the client device 104A, the content server 302 may be operated to retrieve content from a content source 412, such as content identified by a URI. In these and other embodiments, the content source 412 may include a web server, such as the web server 112. Alternately or additionally, the content source 412 may include the secure publishing system 110.

The content server 302 may then serve the retrieved content to one of the content renderers 304, 410 on the client device 104A, where the content renderer 304, 410 is configured to render the content at the client device and to prohibit saving the content in the clear on the client device. For instance, the content renderer 304 may be configured to delete the rendered content from the memory 402 after the consumer 118A is finished consuming the content and not allow the rendered content to be saved to non-volatile storage 406. The rendered content may be rendered through an appropriate output device 408 to the corresponding consumer 118A (FIG. 1). The output device 408 may include, but is not limited to, a display, a speaker, a printer driver, or other suitable output device.

In some embodiments, the content retrieved from the content source 412 may be encrypted with a media key. In these and other embodiments, the media key may be stored in a key ring 414 stored in the non-volatile storage 406 such that one of the content server 302 or content renderer 304, 410 may decrypt the content using the media key.

Optionally, the media key may be encrypted using a public key of the client device 104A corresponding to a private key of the client device 104A that is accessible to the client device 104A. In these and other embodiments, the content renderer 304 or content server 302 may decrypt the encrypted media key using the private key of the client device 104A before using the decrypted media key to decrypt the encrypted content. Alternately or additionally, the private key of the client device 104A may be hidden to prevent the consumer 118A from deliberately sharing the private key and/or media key. The private key of the client device 104A may be hidden by, e.g., encrypting the private key with a key derived from the hardware of the client device 104A, or obfuscating the private key.

As previously mentioned, the content server 302 may be configured to reject serving content to clients that are not on the client device 104A. For instance, the content server 302 may check to ensure the content renderer 304, 410 is connecting from a localhost socket to confirm that the content renderer 304, 410 resides on the same client device 104A as the content server 302. In this manner, network attached devices that allow saving content in the clear may be unable to obtain content from the content server 302 running on the client device 104A.

Alternately or additionally, to prevent unauthorized applications that allow saving content in the clear from impersonating a legitimate content renderer 304, 410, the content server 302 may perform an authentication handshake with the content renderer 304, 410 before serving content to the content renderer 304, 410. For instance, the content server 302 and content renderer 304, 410 may be two threads derived from the same process such that a shared key can be established between the two threads and a session token can be derived from the shared key. Alternately or additionally, the content server 302 and the content renderer 304, 410 may run in separate process spaces with a shared key being embedded in each at compile time or in preferences. Alternately or additionally, public/private key-based authentication can be used to validate that the content renderer 304, 410 is authorized to receive content. Alternately or additionally, a one-way hash of the specific content renderer 304, 410 can be calculated and check that the content renderer class produces that hash. Alternately or additionally, a digital signature embedded inside the content renderer 304, 410 can be inspected to validate the identity of the content renderer 304, 410.

By instantiating the content server 302 on the client device 104A and serving content retrieved by the content server 302 to the content renderer 304, 410, documents can be streamed and rendered by a content renderer such as a video engine, similar to video objects. As such, some embodiments described herein allow for development of common security and licensing methods for both documents and video content.

II. Secure Progressive Download

Alternately or additionally, the content server 302 together with the policy engine 306 can configure the client device 104A with secure progressive download capabilities. Progressive download refers to the ability to start viewing or otherwise consuming content as it is simultaneously being saved on non-volatile storage 406 for later use.

In these and other embodiments, one or more policies associated with content may be retrieved by the policy engine from a policy source 416. The policy source 416 may include, for instance, the business server 122. The policies may govern consumption of the content. In some embodiments, the policies may be enforced by one or more of the components of the software package 300A, such as the content renderer 304.

In other embodiments, the policy engine 306 may be configured to enforce the policies. For instance, the policy engine 306 may examine the policies to determine whether the content can be rendered on the client device 104A. If the policies indicate that the content can be rendered on the client device 104A, the policy engine 306 allows the content server 302 to serve content to the content renderer 304, 410. If the policies indicate that the content cannot currently be rendered on the client device 104A, the policy engine 306 instructs the content server 302 to not serve content to the content renderer 304, 410. In this manner, content may be securely served to generic or third party content renderers 410.

In these and other embodiments, the content retrieved from the content source 412 may be encrypted as already described above. Optionally, the content server 302 may perform decryption on the encrypted content using a media key from the key ring 414. Alternately or additionally, a copy of the encrypted content 418 may be saved in the non-volatile storage 406. Thus, the encrypted content 418 can be governed by policies, decrypted and rendered by the policy engine 306, the content server 302 and the content renderer 410 as it is simultaneously being downloaded and saved on non-volatile storage 406 for later use.

III. Intermixing Conditional Access

Alternately or additionally, the content server 302 together with the policy engine 306 can configure the client device 104A with the ability to intermix conditional access between various content types, such as documents, images, audio and/or video. Some implementations of DRM and policy engines fuse the content renderer with a specific DRM implementation. Thus, to implement a consistent set of DRM policies across multiple media types might require the integration of several renderers into a single DRM engine. In contrast to the immediately foregoing, some embodiments described herein permit intermixing conditional access between various content types by using a single policy engine 306 that can interface through the content server 302 with virtually any generic, third party or native content renderer 410 that does not implement DRM but adheres to the requirement that the content renderer 410 not save content in the clear to non-volatile storage 406.

Accordingly, the content renderer 410 in some embodiments may include any one of multiple content renderers, each configured to render a different type of content and each configured to prohibit saving the content in the clear on the client device 104A. The different types of content may include, but are not limited to, document files, image files, audio files, or video files.

Alternately or additionally, prior to the content server 302 serving content to any of the content renderers represented by the content renderer 410 of FIG. 4A, the content server 302 may verify an identity of the content renderer 410. Verifying an identity of the content renderer 410 may include performing an authentication handshake between the content renderer 410 and the content server 302. Alternately or additionally, verifying an identity of the content renderer 410 may include authenticating the content renderer 410 by its digital signature.

Alternately or additionally, an identity of the content renderer 410 may be verified by the business server 122 using a key, password or digital certificate that has been issued to an author of the content renderer 410. If the content renderer 410 is compromised, the business server 122 can invalidate all content renderers across all devices using that key, password, or certificate.

IV. Subscribing to Content

Some embodiments described herein may permit content distribution to both closed and open workgroups, e.g., known and unknown users. In these and other embodiments, contents, policies and subscribers (e.g., consumers) may be tracked with device identifiers, or unique identifiers associated with each client device 104A, 104B, instead of usernames and passwords, which may reduce risks associated with theft of user data. An example embodiment will be described with combined reference to FIGS. 1 and 4A.

Some implementations of content licensing generally require a subscriber to maintain and use separate authentication credentials, such as usernames and passwords, and separate software from multiple publishers. In the embodiments described herein, however, licensed content can be provided to subscribers from multiple publishers without the subscriber having to manager usernames and passwords.

In these and other embodiments, the publisher 120 may host the secure publishing system 110 or rent the use of an instance of the secure publishing system 110 deployed in a SaaS environment, as previously described. The consumer 118A may become a subscriber of the publisher 120 after the consumer 118A installs the software package 300A on the client device 104A and subscribes to one or more content channels offered by the publisher 120. Instructions and links for installing the software package 300A may be provided to the consumer 118A via email, or on the publisher's 120 website including web pages 130, for instance. In general, the software package 300A is not publisher-specific, although the software package 300A may optionally be customized to include information regarding the publisher's content.

All of the content and/or content channels offered by the publisher 120 may collectively form the publisher's 120 "realm." As will be described in greater detail below, installing the software package 300A on the client device 104A enables the client device 104A to register itself into one or more realms and request content, categorized by channels, from those realms. Information about the location of realms and the channels supported by each may be embedded within "subscription" files that can be processed by the software package 300A. The subscription files, or links to the subscription files, are not subscriber specific in some embodiments and can be emailed to the consumer 118A or placed on a website, such as on one or more of the publisher's 120 web pages 130. Alternately or additionally, information regarding the publisher's 120 realm and/or the content channels it supports may be included in the software package 300A when the software package 300A is downloaded from the publisher 120 or when the software package 300A is otherwise customized in this manner for the publisher 120.

After the software package 300A is installed on the client device 104A, a content channel and/or corresponding publisher's realm may be identified, e.g., by the consumer 118A, for subscription. In the present example, it is assumed that the identified content channel is within the publisher's 120 realm. The registration engine 308 may then register the client device 104A with the secure publishing system 110 corresponding to the publisher 120. In some embodiments, the registration process may begin in response to the software package 300A being installed on the client device 104A. Registering the client device 104A with the secure publishing system 110 may include providing a hardware fingerprint of the client device 104A, a hash derived from the hardware fingerprint, or other identifier derived from the hardware fingerprint, to the secure publishing system 110, creating a private key/public key pair at the client device 104A and sending the public key from the client device 104A to the publisher server 124. The publisher server 124 may generate and return to the client device 104A a license number that uniquely identifies the client device.

The hardware fingerprint may be derived from hardware of the client device 104A, such as a hard drive, chip set, motherboard, CPU, or other hardware of the client device 104A. In particular, such hardware may include or have associated therewith a unique identifier, such as a hard drive serial number, a chip set serial number, a motherboard serial number, a CPU serial number, an International Mobile Equipment Identifier (IMEI) number, or other uniquely identifying number associated with hardware of the client device 104A. The foregoing unique identifiers associated with hardware may be referred to hereinafter as "hardware tokens." In some embodiments, the hardware token(s) used to derive the hardware fingerprint may be selected from hardware that is not generally removable from the client device 104A. Accordingly, in some embodiments, the hardware fingerprint may be derived by the registration engine 308 or other component of the client device 104A obtaining one or more hardware tokens from one or more hardware devices of the client device 104A. The one or more hardware tokens may then be concatenated in a certain order and run through a one-way hash function to obtain the hardware fingerprint.

At the secure publishing system 110, the hardware fingerprint is received from the registration engine 308 and saved in a database, such as in storage 128. In addition, the client device 104A may create a private key and public key pair and may communicate the public key to the secure publishing system 110. The secure publishing system 110 may create a license number that uniquely identifies the client device 104A and send it to the client device 104A. The public key and the license number may also be saved in the database. The private key on the client device 104A may be saved to the non-volatile storage 406 in the key ring 414.

The private key and license number may be randomly generated to be difficult to be guessed by hackers. In contrast, the hardware fingerprint for the client device 104A is always the same for the client device 104A. To protect the hardware fingerprint from being compromised, the hardware fingerprint or a hash derived therefrom or other identifier derived therefrom may only be communicated to the secure publishing system 110 to identify the client device 104A during the registration process over a secure channel such as Secure Sockets Layer (SSL). Subsequently, the client device 104A may provide its license number, rather than its hardware fingerprint, to the secure publication system 110 for identification when requesting content, policies, etc.

To prevent the private key from being deliberately shared by the consumer 118A, it may be hidden on the client device 104A. For instance, prior to saving the private key to non-volatile storage 406, it may be encrypted using the hardware fingerprint, or a hash derived therefrom or other identifier derived therefrom, since the hardware fingerprint can be derived from the hardware of the client device 104A at any time such that it need not be stored in the non-volatile storage 406. When use of the private key is desired, it can be decrypted in the memory 402 using the hardware fingerprint without ever being saved in the clear in the non-volatile storage 406.

Alternately or additionally, the private key may be hidden on the client device 104A by obfuscating the private key. In general, obfuscating the private key may involve, prior to saving it to non-volatile storage 406, rearranging the bits of the private key using a reversible algorithm known to the software package 300A. For instance, the private key received from the secure publishing system 110 may be obfuscated in memory by the registration engine 308 applying the algorithm before saving it to the non-volatile storage 406. When use of the private key is desired, it can be rearranged in memory by the registration engine 308 reversing the algorithm without ever being saved in the clear in the non-volatile storage 406.

After registering the client device 104A with the secure publishing system 110, the client device 104A may then subscribe to a content channel served by the secure publishing system 110. Subscribing to the content channel may include providing the client device's 104A license number and a channel identifier corresponding to the content channel to the secure publishing system 110. Subscribing to the content channel may be performed by the registration engine 308 or other component of the software package 300A. The secure publishing system 110 may authenticate the client device 104A using only the license number in some embodiments, thereby dispensing with a username and/or password to authenticate the consumer 118A to access content and/or policies available through the secure publishing system 110.

Content distributed to the client device 104A through the content channel to which the client device 104A has a subscription can be securely rendered on the client device 104A in accordance with one or more policies associated with the content as described elsewhere herein. Depending on the associated policies, in some embodiments, rendering rights for the content may be depleted at some point. In these and other embodiments, the software package 300A may request a storefront URL of the publisher 120 from the secure publishing system 110 to request renewed access to the content. The storefront URL of the publisher 120 may include one of the publisher's 120 web pages 130, for instance.

The client device 104A, and more specifically one of the components of the software package 300A, may receive the storefront URL from the secure publishing system 110 and construct a modified URL. The modified URL may be based on the storefront URL, the license number of the client device 104A, and an identifier of the content channel through which the content was delivered, and/or an identifier of the specific content. For instance, the client device's 104A license number, the content channel identifier, and/or the content identifier may be added to the storefront URL to construct the modified URL. The client device may then launch a browser to the modified URL such that the license number, the content channel identifier and the content identifier are provided to the publisher.

After the client device 104A connects to the publisher's 120 website using the modified URL, the publisher 120 may query an asset management system (not shown) to determine one or more of pricing, authorization and/or other information regarding the content using the license number, content channel identifier, and/or content identifier. The publisher may then present one or more purchasing or authorization options to the client device 104A. Because the license number uniquely identifiers the client device 104A, the publisher does not need further authentication, such as a username and/or password of the consumer 118A, but may do so anyway for other reasons.

The one or more purchasing or authorization options regarding the content may be displayed at the client device 104A, such as on a display (not shown) of the client device 104A. The options may be displayed in a browser or other application running on the client device 104A. The client device 104A may subsequently receive user input representing a user selection (e.g., a selection by the consumer 118A) of one of the one or more purchasing options and communicate the user selection to the publisher's 120 website to complete a purchase or authorization transaction.

In response to receiving the user selection, the publisher 120 may send instructions to the secure publishing system 110 indicating any change in access rights for the content on the client device 104A. The secure publishing system 110 may receive the instructions from the publisher 120, update the client device's 104A access rights, and send the updated access rights to the client device 104A. The client device 104A may receive the updated access rights and then render the content in accordance with the updated access rights. The updated access rights may be embodied in one or more updated policies, for instance, that govern consumption of the content at the client device 104A.

The foregoing methods may be used to invite subscriptions to content from consumers 118A that are known to the publisher 120 as well as potential consumers that are unknown to the publisher using email and/or website links. For known users, the publisher 120 can manipulate content authorization/access rights directly for a given consumer. For unknown or anonymous consumers, the publisher 120 can provide customer support, device disabling, one-time promotions, or the like or any combination thereof.

While the foregoing example describes various actions performed by the publisher 120, it is understood, with the benefit of the present disclosure, that the actions need not be performed manually by an individual representing the publisher 120 but can be automated and/or performed by one or more of the client device 106, the web server 112, or other components. Thus, whether actions are performed manually by an individual representing the publisher 120, or by a component owned or under the control of the publisher 120, or otherwise at the behest of the publisher, the actions may be described as being performed by the publisher 120.

In these and other embodiments, theft or other unauthorized use of the client device's 104A license number by a third party may allow the third party to approach the publisher 120 to request changes to access rights for content for a given subscriber (e.g., consumer 118A). However, the access rights may still only be applicable on the consumer's 118A registered client device 104A since without the client device's 104A private key, the media key for the content cannot be decrypted for rendering. Thus, content cannot be accessed in an unauthorized manner using an authorized client device's 104A license number alone. Moreover, in embodiments in which the private key is hidden, even if the hidden private key is compromised along with the license number, the access rights may still only be applicable on the consumer's 118A registered client device 104A unless the client device's hardware fingerprint used to encrypt the private key or the reversible algorithm used to obfuscate the private key is also compromised.

V. Aggregating Content Analytics

Some embodiments described herein may include aggregation of content consumption analytics for fraud detection and content piracy reduction. These and other embodiments may include revoking or modifying content access rights on client devices 104A, 104B for content piracy reduction and/or integration with forensic watermarking to increase the power of fraud detection and content piracy reduction.

With continued reference to FIGS. 1 and 4A, a method of aggregating content analytics may include the secure publishing system 110 providing content to the client device 104A. A policy governing consumption of the content by the client device 104A may also be provided to the client device 104A. Alternately or additionally, a license against a policy may be provided to the client device 104A. The secure publishing system 110 may also collect content metrics associated with at least one of providing the content to the client device 104A or consumption of the content by the client device 104A. In some embodiments, the content metrics collected by the secure publishing system 110 are initially collected on the client device 104A by the content renderer 304 or other component of the software package 300A. The secure publishing system 110 may then analyze the content metrics for at least one of fraud detection or content piracy reduction.

In more detail, content metrics including content consumption may be collected by the software package 300A to enforce licensing. The content metrics may alternately or additionally include a number of times content is downloaded to the client device 104A. In these and other embodiments, the content metrics may be stored in non-volatile storage 406 and periodically or at other intervals uploaded to the secure publishing system 110 during the download of policies from the policy source 416 and/or at other times. The uploaded content metrics may serve a security function: if the consumer 118A attempts to undo content consumption of the client device 104A by backing up and restoring local storage (e.g., non-volatile storage 406) on the client device 104A to a previous state where the content metrics indicate content consumption that is lower than at the current state, a copy of the content metrics from the secure publishing system 110 is available to re-sync the content metrics on the client device 104A.

In the event a rogue hardware maker clones an authorized client device, such as the client device 104A, such that the clones and the authorized client device have the same hardware fingerprints, the re-syncing of the content metrics may ensure that unauthorized use of the content is limited. For instance, if an associated policy limits access of the content to N views, after the content is viewed N times across N or fewer cloned devices and the content metrics collected by those cloned devices are uploaded to the secure publishing system 110, the secure publishing system 110 can prevent further access by any of the N cloned devices and any additional cloned devices by sending updated access rights (e.g., a lack of access rights) to the N cloned devices or to the additional cloned devices. Thus, if the number N of views allowed by the policy is small, such as five views, no more than five cloned devices would be able to access the content, making device cloning an unattractive proposition.

In other embodiments, the policy associated with the content may not limit the number N of views or other renderings of the content. In these and other embodiments, content metrics including content consumption may not be an effective cap for preventing fraud. Instead, the number of downloads of content by one or more client devices that all use the same license number or other unique identifier may be indicative of systemic device cloning. For instance, if the same content is downloaded an unusually high number of times using the same license number from the secure publishing system 110, this may be indicative that the client device 104A has been cloned, and the publisher 120 may react by using the secure publishing system 110 to disable all access rights to content subscribed to using the license number as a means of fraud prevention until the consumer 118A can verify their use case to the publisher 120.

Watermarking of content can also be used to trace the source of leaked content. For instance, content can be watermarked with the client device's 104A license number or other identifying information associated with the subscriber prior to being downloaded from the secure publishing system 110 to the client device 104A. For instance, if the content includes viewable content such as a document or video, the content may be watermarked such that the license number or other identifying information appears in the rendered content. If an unauthorized copy of the content is created by a camera or other means and then distributed in an unauthorized manner, a watermark analyzer (not shown) at the secure publishing system 110 or elsewhere can be used to detect the license number or other identifying information embedded in the content. For anonymous consumers, e.g., consumers in open workflows, the license number is sufficient to suspend distribution of content to that consumer's client device and/or to revoke access rights for that client device. Similar actions can be taken against known consumers, e.g., consumers in closed workflows, and/or known consumers may have additional incentives/more at stake for such infractions.

VI. Aggregating Content

Some embodiments described herein may include aggregation of content from one or more client devices 104A, 104B to the secure publishing system 110. For instance, with combined reference to FIGS. 1 and 4A, client content may be aggregated at the secure publishing system 110 from the client device 104A by storing the client device's 104A private key at the client device 104A. The corresponding public key may be accessible to the secure publishing system 110. For instance, the public key may be stored in the storage 128 of the secure publishing system 110. A unique identifier associated with the client device 104A, such as the client device's 104A license number, may be stored at the client device 104A. The media key previously received from the secure publishing system 110 may also be stored at the client encrypted by the public key.

The client device 104A may receive a selection by a subscriber, e.g., the consumer 118A, of content on the client device 104A (hereinafter "client content") to upload to the secure publishing system 110. The client content may include, for instance, surveys, news clips, or edited versions of content received from the secure publishing system 110. The client device 104A may decrypt the media key using the client device's 104A private key. The media key may be decrypted in the memory 402 and/or in a protected portion of the memory 402. The client content may be encrypted using the decrypted media key. The encrypted client content may be tagged with the client device's 104A unique identifier. The tagged and encrypted client content may be uploaded to the secure publishing system 110.

It will be understood, with the benefit of the present disclosure, that one or more of the methods and features described above in connection with the client device 104A of FIG. 4A can alternately or additionally be implemented in the client device 104B of FIG. 1 and/or in other client devices. Alternately or additionally, methods and features described in connection with the client device 104B can alternately or additionally be implemented in the client device 104A.

Figure 4B:
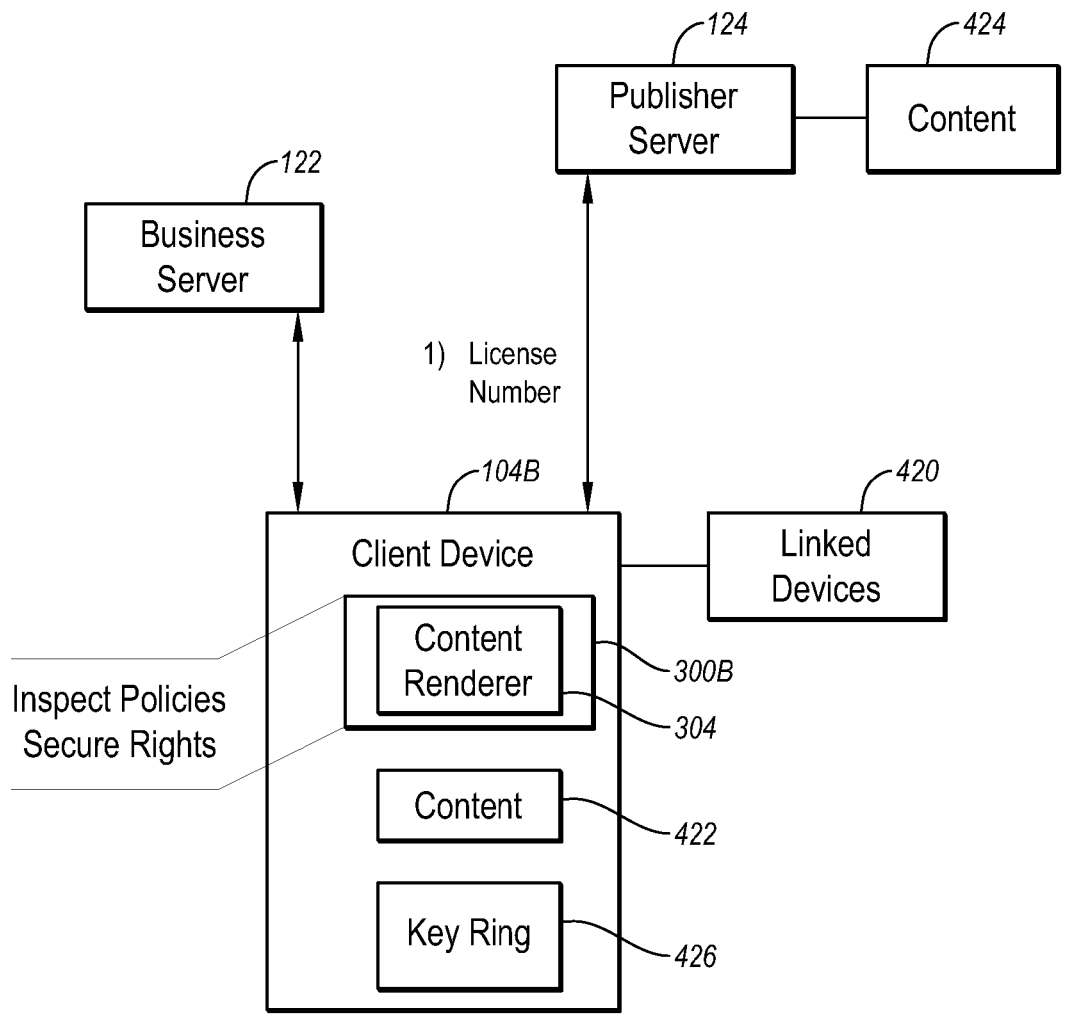
FIG. 4B illustrates an example embodiment of a client device implemented as a desktop computer.

FIG. 4B illustrates an example embodiment of the client device 104B implemented as a desktop computer. Alternately, the client device 104B may be implemented as a smartphone or other client device. Although not shown, the client device 104B of FIG. 4A may include a memory, processing device, and/or non-volatile storage, that function similar to the memory 402, processing device 404, and/or non-volatile storage 406 of FIG. 4A. In the embodiment of FIG. 4B, the client device 104B has downloaded and loaded into its memory (not shown) a software package 300B, which is an embodiment of the software package 300 of FIG. 3. The software package 300B includes the content renderer 304. In the illustrated embodiment, the consumer 118B associated with the client device 104B may have one or more linked devices 420 on which content may optionally be consumed after authentication thereof.

With combined reference to FIGS. 1-4B, the content renderer 304 may operate on the client device 104B to identify information related to the consumption of content 422 that has been downloaded to the client device 104B from the secure publishing system 110, or more particularly from the publisher server 124 in some embodiments. The content 422 may include some of the content 424 supported by the publisher server 124, e.g., corresponding to the content output by the content processing system 108. Moreover, the content 422 stored on the client device 104B may be encrypted, similar to the encrypted content 418 of FIG. 4A.

In some embodiments, the information collected by the content renderer 304 may be identified in the policies associated with the content 422. For example, the content renderer 304 may identify which content 422 is actually consumed as well as how that content 422 is consumed. The content renderer 304 may track how long the content 422 is used, what other content 422 is considered by the client device 104B, or the like.

The business server 122 may provide the client device 104B with a license number as described above, which is usually unique. The license number can optionally be used to link the linked devices 420. The business server 122 may restrict the number of devices registered under a single license.

After the license number is received by the client device 104B, the client device 104B may inform the publisher server 124 that certain content should be pushed or transmitted to the client device 104B. After the consumer 118B clicks a button, for example at the publisher's 102 website, the content 424 (which has been prepared for distribution), may be distributed to the client device 104B. The content 424 appears as the content 422 on the client device 104B. As previously stated, the content 422 may be encrypted at the client device 104B.

The content 422 can be consumed when the consumer 118B operates the client device 104B to open the content 422, which is typically encrypted. In some embodiments, the content 422 is never presented "in the clear" to the client device 104B or the consumer 118B. For instance, the content 422 may remain encrypted in non-volatile storage and only be decrypted in memory and/or in some other manner that effectively prevents the client device 104B and/or the consumer 118B from copying the content 422 in an unencrypted form. In some embodiments, all decryption occurs in volatile memory and often in protected memory. In some instances, the content 422 may be protected from being "in the clear" by the operating system of the client device 104B. The volatile memory of the device may be used to filter the encrypted content on the fly when the content is consumed. As previously discussed, the content 422 may be decrypted with a media key, which in turn may be decrypted with a private key of the client device 104B.

When the content 422 is opened or otherwise accessed at the client device 104B, the content renderer 304 may inspect the policies associated with the content 422 to determine how the content 422 can be consumed. In some instances, the client device 104B (and the consumer 118B) may be able to consume the content 422 immediately. Alternatively, the client device 104B may be directed to the publisher's 120 portal (e.g., a URL) or website to license (e.g., rent, purchase) the content 422. After the license transaction is completed, the content 422 can be accessed or consumed in accordance with the purchased license, which may typically be reflected in the policies.

When the content 422 is part of a subscription, new content may arrive on the client device 104B and/or linked devices 420 as the publisher 120 creates the new content. Periodically, a key ring 426, which may be used to store the client device's 104B keys and unlock or decrypt the content 422, may also be updated. For instance, if the consumer 118B had purchased a subscription policy for a certain period of time, all content from the publisher 120 that is covered by the subscription policy may be viewable for that length of time. After the period of time ends, the consumer 118B may no longer be able to consume the content even when the content remains on the client device 104B.

According to some embodiments described herein, data exchange between two parties, such as the publisher 120 and consumer 118B, or between two consumers 118A, 118B, can be carried out any time the secure publishing system 110 is online. In particular, employees of the publisher 120 may login through the client device 106, upload content, and/or administer policies for the content and the subscriber base whenever convenient. On the other side, client devices 104A, 104B may periodically, or whenever the consumer 118A, 118B initiates, check for new content from the publisher 120 distributed through the secure publishing system 110. As long as the secure publishing system 110 is online, it is not necessary for the publisher 120 and consumers 118A, 118B to be online simultaneously. When combined with content aggregation, the publisher 120 can collect data from consumers 118A, 118B, optionally filter, format and/or process the collected data, and re-publish the output to another group or the same group of consumers. Basic consumer authentication may already be in place without requiring usernames and/or passwords due to the client device registration process described above.

Figure 5:
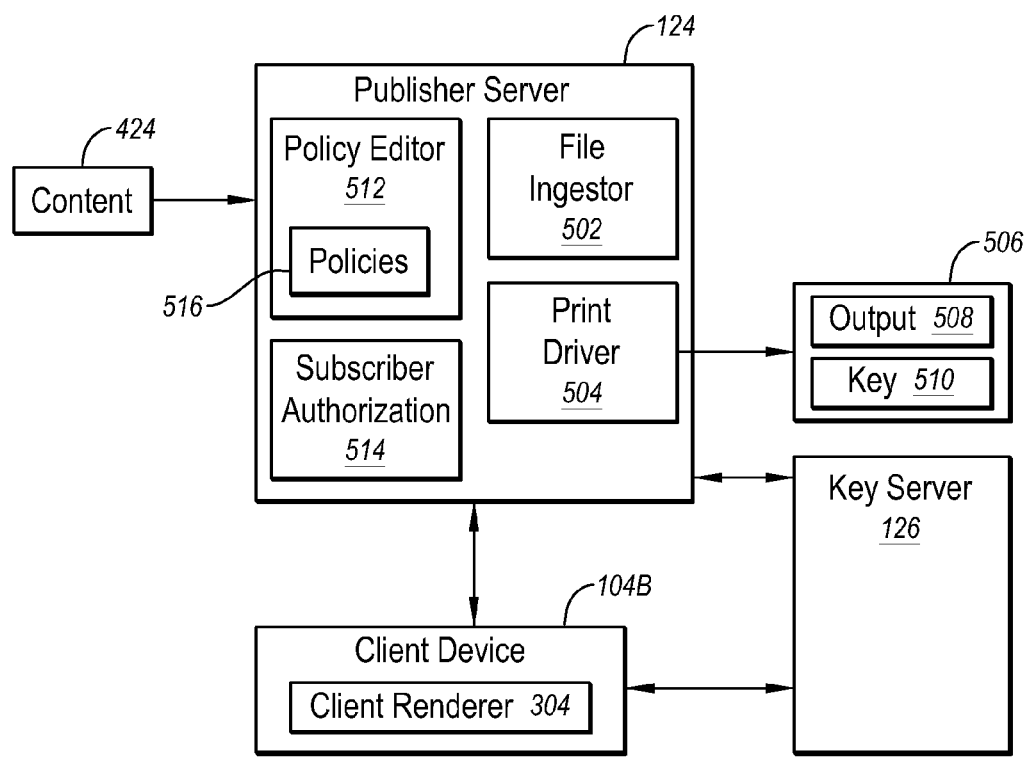
FIG. 5 shows an example embodiment of a publisher server that may be included in the operating environment of FIG. 1.

FIG. 5 shows an example embodiment of the publisher server 124 that may be used in the preparation and/or distribution of content. In the example embodiment of FIG. 5, the publisher server 124 may be configured to perform some of the operations described above as being performed by the content processing system 108. Particularly, the publisher server 124 may include a file ingestor 502 and a print driver 504.

With combined reference to FIGS. 1-5, the file ingestor 502 may be a content encryption component. The file ingestor 502 can be invoked for single instances of content (e.g., a file) or operated in batch mode. The publisher 120, for instance, may be able to drag and drop a file to the file ingestor 502. The file ingestor 502 may create an encrypted output 506 that can be consumed (e.g., viewed) with the appropriate codec. In other words, the encrypted output can usually be consumed on the client device 104B (or other client device 104A, or the like) using a matching decrypting codec that may be called by the client device's 104B native viewer for the file type being decoded. If the content does fall in this category, the file ingestor 502 may attempt to locate an application that can "print" the file type and may attempt to invoke a "print" operation to the printer driver 504 described below. If these operations fail, a non-zero error code may be returned to the operating system to aid in scripting automation. The output 506 may include an output file 508 (e.g., an output.s2g file which is an example of a container) along with a media key 510 to decrypt the output file 508.

The print driver 504 may be installed on the publisher server 124 or as an appliance or as standalone software. The print driver 504 may make a virtual printer available to the system. Any application in the system may print to the print driver 504 to have the output captured in a format that is suitable for viewing or consuming, for example, using the content renderer 304 on the client device 104B. In one example, the captured output is encrypted as previously described. The output of the print job may include the .s2g file 508 and media key 510 that are saved to disk.

Alternately or additionally, the publisher server 124 may include a policy editor 512 and/or a subscriber authorization 514. The policy editor 512 can be used to set policies 516 on how the content can be consumed. The policy editor 512 may be implemented as a web application and may be hosted as SaaS. When setting policies, the publisher 120 may create a list of master polices and then may assign those policies to folders and/or individual files, which may be identified by corresponding locators. Policies at the folder level may be expanded on a per-file basis when content meta data is uploaded to the key server 126. Each policy in the master list may be assigned a unique identifier (UID) so that its activation and expiration can be tracked by the key server 126 in some embodiments. Keys and policies (including UIDs) that are applicable to each file may be uploaded to the key server 126 and policies available for each file may be uploaded to the publisher's 120 website (e.g., including web pages 130) to facilitate the publisher's 120 monetization engine. The key server 126 may maintain a database of policies that are active or have expired or have been consumed by each subscriber (e.g., consumers 118A, 118B). The key server 126 may generate a file containing only the active policies and keys for each consumer 118A, 118B. As used herein, the term "file" can refer to any data structure that can be exchanged between two network devices, such as a client device and a server, through file transfer or web services.

For example, the publisher 120 may have two folders (A & B) of content. Subscribers (consumers 118A, 118B) may have three day trials of any content within folder A and an independent three day trial of any content within folder B. Also, folder A may allow 12 month subscriptions to any content within it, while folder B may allow the subscriber to purchase any content within it. To implement this monetization model, the publisher 120 may create two master policies for 3 day trials and assign one to each folder (UID1—folder A; UID2—folder B). The publisher 120 may also create a third policy for "Consumption period of 365 days" and a fourth policy for "Consumption allowed until forever" (UID 3—folder A; UID 4—folder B).

In some embodiments, as the key server 126 receives each file's metadata, it checks to see if a consumer has activated the free trial UID or not. If so, the key server 126 updates the expiration date for the key and policy UID in that consumer's records. This may be done for all consumers. Similarly, the publisher 120 can send a web notification to the key server 126 that UID3 has been activated for a specific consumer or client device. This would again trigger the update of the valid keys for that consumer. Free trials may be handled separately because they do not need to rely on explicit authorization messages.

The subscriber authorization component 514 may also be invoked as a web application. The subscriber authorization component 514 in some embodiments takes a consumer id. (e.g., identified by the a license number, hardware token, or email id or the like), and allows the publisher server 124 to send messages to the key server 126 granting or revoking policy UIDs for that consumer (or client device(s)) for specific file locators. The publisher server 124 may invoke this component as a web service to authorize content when payment is received.

The content renderer 304 may be downloaded and installed on the consumer's 118B client device 104B as part of the software package 300, and/or from a third party. Alternately or additionally, the content renderer 304 may be native to the client device 104B. The content renderer 304 in some embodiments consults an encrypted keys database that has been downloaded from the key server 126 to determine if a certain .s2g file can be consumed or not. If consumed, then the content renderer 304 (or, e.g., a policy engine 306) applies the policies for the associated content.

The key server 126 can be deployed as SaaS. The key server 126 maintains three databases in some embodiments, including: (1) a database of each file from the publisher 120 (locator, key, and policies); (2) a database of consumer 118A, 118B information (license #, device/account id. on the client devices 104A, 104B, a public key for encrypting communications to each client device 104A, 104B, alternate credentials such as hardware token id. and email addresses); and/or (3) an active subscriber key database (license #, content locator, content key, active policy UID, expiration date or consumption state of the policy UID).

Figure 6:
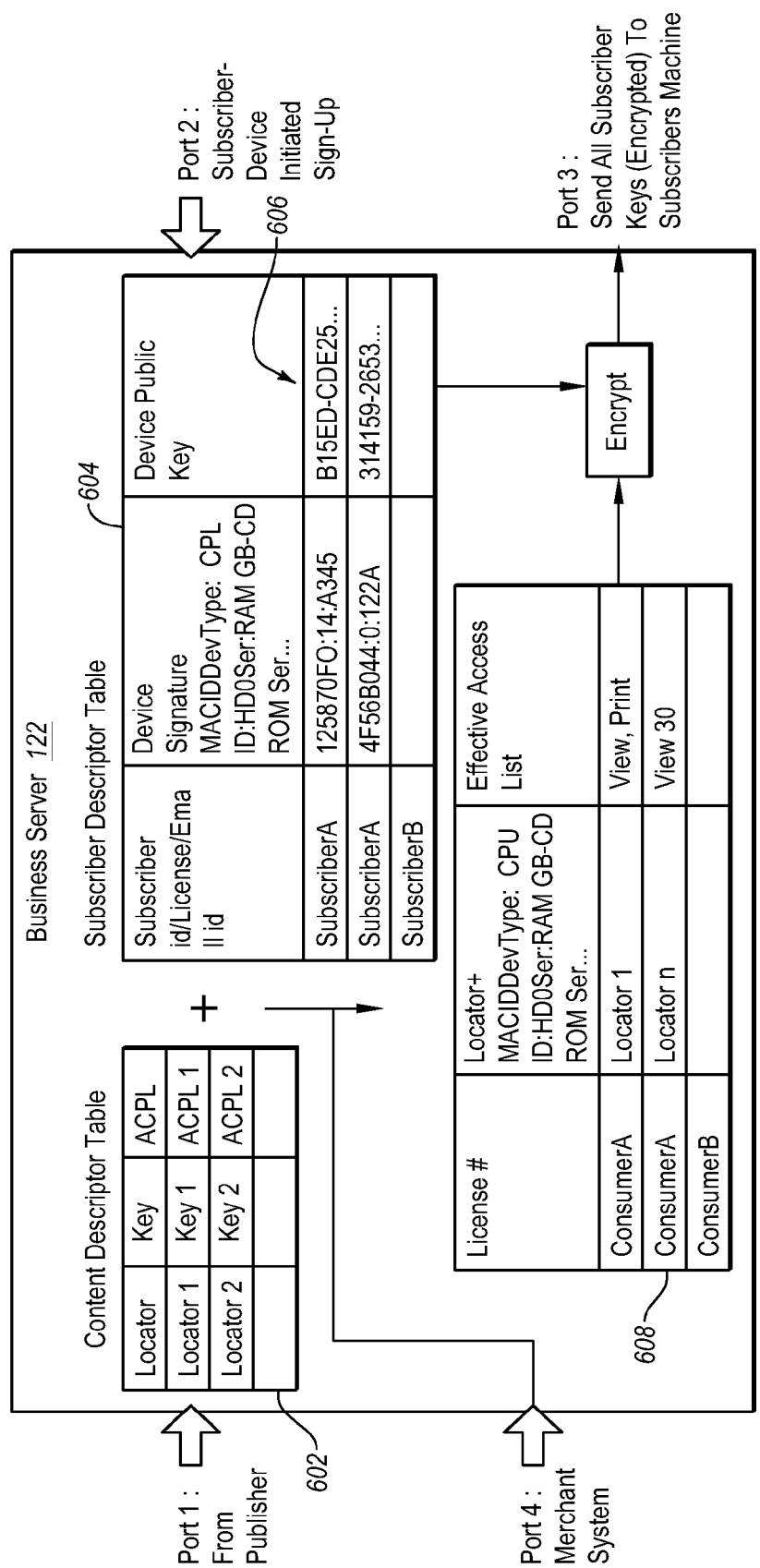
FIG. 6 shows an example embodiment of a business server that may be included in the operating environment of FIG. 1.

FIG. 6 shows an example embodiment of the business server 122. The business server 122 includes four ports in this embodiment, although the business server 122 may include fewer or more than four ports in other embodiments. The four illustrated ports may include logical ports for clarity of explanation. In practice, communications for all four ports may occur over a single web service port or may be spread over four distinct web service ports, or the like.

On one port, the business server 122 receives the content description from the publisher 120 and stores it in a content descriptor table 602. The content descriptor table 602 may store a locator, a media key, and an ACPL for each content file. On the second port, the business server 122 obtains a device signature from each client device 104A, 104B subscribed to content from the publisher 120 and stores this information in a subscriber descriptor table 604 together with a public key 606 for each subscribed client device and a unique identifier, such as a license number, for each subscribed client device. Whenever entries are modified in either table 602 or 604, or at scheduled intervals, or when access to content is purchased through a merchant system on the fourth port, the business server 122 may repopulate a table 608 that maps consumers (or subscribed client devices) to the content locators and the effective access (the ACPL) the subscribed client devices have for that content. When a subscribed client device connects and authenticates on the third port, some or all entries pertaining to the subscribe client device are encrypted using the client device's public key and pushed to the client device. The client device can decrypt this information with the corresponding private key. Because the public/private keys are tied to the device, only the appropriate client device has the private key in some embodiments. Moreover, the table structure depicted in FIG. 6 (and FIG. 7) and described herein is provided for illustrative purposes only. Other systems of tabulating data in databases may be employed to track information in some embodiments.

Figure 7:
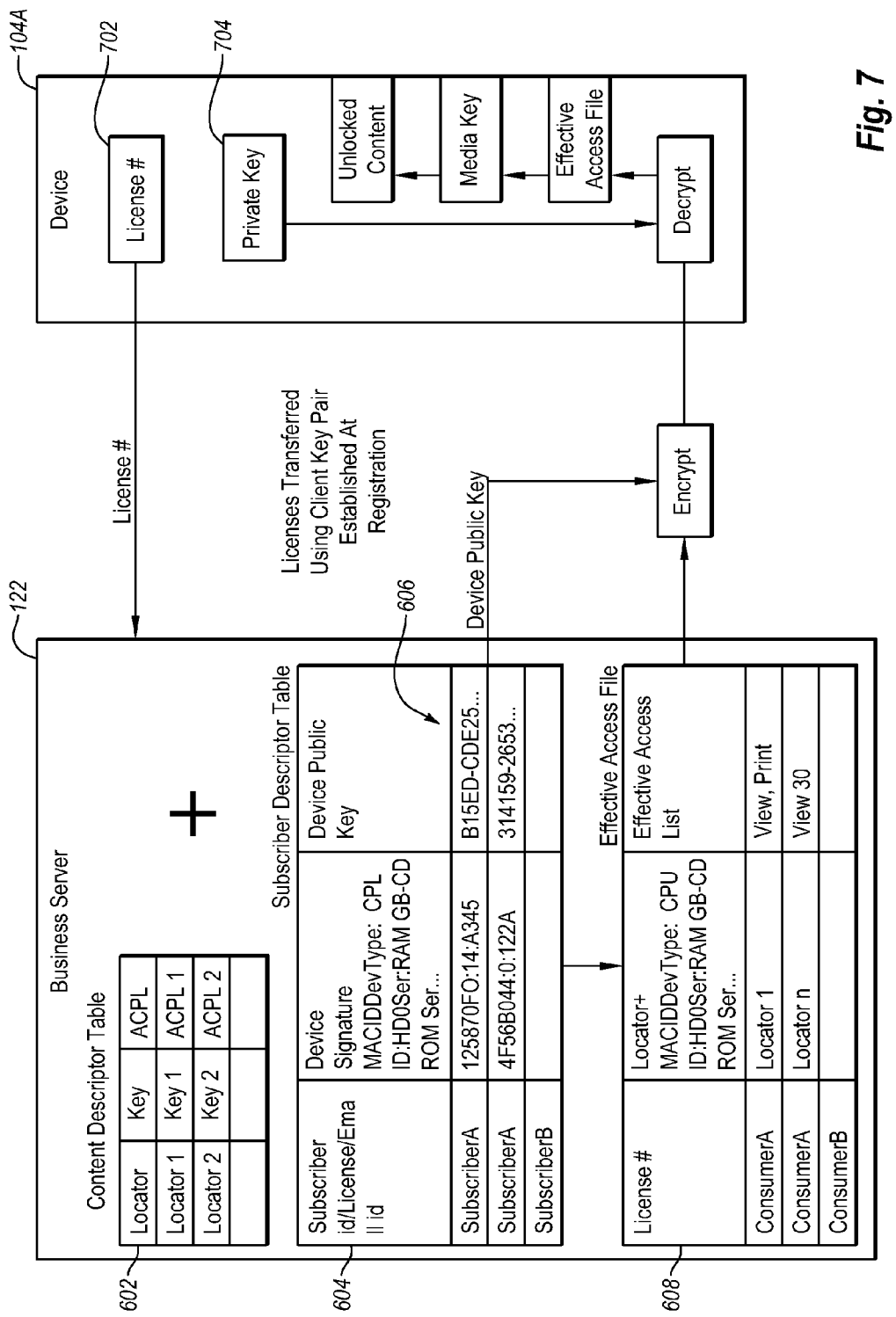
FIG. 7 shows an illustrative example of obtaining policies from a business server by a client device.

FIG. 7 shows an illustrative example of obtaining policies from the business server 122 by the client device 104A (or the client device 104B, or other client device). In this example, the client device 104A presents its license number 702 (or a user name, or a hardware token (e.g. from a smartcard or a security dongle), or an email address, or other uniquely identifying information). The license number 702 may be encrypted using the client device's 104A private key 704. The business server 122 can identify the client device 104A based on which of the public keys 606 in the subscriber descriptor table 604 that will unlock the encrypted license number.

In some embodiments, the business server 122 replaces effective access policies for all encrypted content that may have been downloaded to the client device 104A. In case the private key 704 is compromised for the client device 104A, a new key pair can be generated and the new private key provided to the client device 104A and the new public key provided to the business server 122. In some embodiments, none of the encrypted content needs to be re-downloaded to the client device 104A (the size of the content is assumed to be large, in general).

In some embodiments, the effective access list on the business server 122 includes the purchased (or those marked "free") policies for each client device plus a "consumption state" of that policy for the client device. For example, if a policy for a free 10 day trial has been activated by the client device by rendering a piece of content, the business server 122 might change the state for that policy from "uninitialized" to "started on date:time." In this manner, when a linked device associated with the client device 104A attempts to render the same content (where access to linked devices is permitted), the linked device may be informed of the state of consumption for the policy. If the publisher 120 insists that the state of consumption of each policy must be updated on the business server 122 prior to content consumption (in order to keep all devices belonging to a consumer synchronized), an attribute requiring a tethered connection can be specified on a per-policy basis.

Policies may be made by combining three components in some embodiments: a primitive, its parameters, and its attributes. Primitives are base policy types that are supported by the secure publishing system 110 and the content renderer 304 (or policy engine 306). The parameters allow the publisher to configure the policies, while the attributes are flags that are set to modify the action of the primitives.

In some embodiments, the primitives that are supported include one or more of the following primitives described below, along with the <parameters> of the primitive:

1. Consumption period of <N> minutes, starting when content is first accessed by a client device.
2. Consumption period starting from <date:time> and lasting until <date:time>.
3. Consumption of content contingent on content identified by <locator> being accessed previously.
4. Consumption of content contingent on content identified by <locator> not being accessed previously. This primitive, along with primitive 3, may be used to enforce that content is consumed sequentially.
5. Treat any reference to <locator> as if it applies to this content as well. One use of this primitive is to control related content. For instance, if an HD version and a mobile version of the same raw content are made, the publisher 120 can specify this policy in the mobile version to ensure that the same policies that cover the HD version apply to the mobile version (otherwise, these two variants of the same content may still be treated as separate by the secure publishing system 110).

Further modification of these primitives may be performed with the use of the following policy flags:

1. View: The content renderer 304 (or policy engine 306) should permit on-screen viewing of the specified content.
2. Print: The content renderer 304 should permit printing of the specified content.
3. Edit: The content renderer 304 should permit the consumer to edit the specified content.
4. Free: The business server 122 should assign a key for this content locator to all consumers that have either not started consuming this content, or have not expired their free consumption period. When the free flag is not set, the business server 122 cannot assume how the publisher 120 intends to monetize this content, and may thereby force a visit to the publisher's 120 website including web pages 130.
5. Allow search box: the content renderer 304 should provide text search capability for the content.
6. Allow copy from document: the content renderer 304 should allow the consumer to select text and images to the clipboard.
7. Save in the clear: the content renderer 304 should save a DRM-free copy in the clear on the consumer's file system, if requested. The native format of the content file should be used, if possible.
8. Require tethered (tight) consumption authorization: this flag tells the content renderer 304 to require a business server 122 communication prior to consumption of any content per any policy. By doing so, the business server 122 can provide accurate time information, as well as synchronize all client devices belonging to a consumer. However, the tradeoff is that the consumer must be tethered to consume the content.
9. Consumption is limited to a <domain>: The content renderer 304 (or other component of software package 300) must check local credentials to allow content consumption only if the client device being used to consume the content belongs to a specified network domain.
10. Consumption is limited to <N> client devices (implies tethered operation).
11. Consumption limited to <N> consumers (implies tethered operation).

Policy UID may apply to individual content (files) or all content with the same UID. Suppose a publisher sets a 10-day free trial on a folder of content. By specifying that the policy UID applies to all content from the publisher that uses the same setting, the content renderer 304 can keep a single clock for all content. On the other hand, if the flag is set to enforce the clock at a file level, then each file has its own clock that starts when the file is first opened.

Closed devices may be easier to secure than open devices such as PCs. Without the benefit of a smartcard or hardware dongle, a limit of security for some embodiments described herein may lie in how well the content renderer 304 or other component of the software package 300 on the client device 104A, 104B is "hardened" to prevent media keys and/or client device private keys from being stolen. In other words, the hardness of the content renderer 304 can vary.

Some embodiments described herein provide publishers 120 and consumers 118A, 118B a means of securely exchanging protected content, but without making DRM functionality call attention to itself (for legitimate consumption scenarios). In some examples, the embodiments disclosed herein may:

1. Ensure that email addresses are not stored, passwords are not required, and/or that credit card information is not stored or handled.
2. Ensure that delays past a payment and when content is render-able is identified (and therefore can be mitigated).
3. Ensure that the "clock" on content and subscriptions starts only when the policy pertaining to that clock is first invoked. This occurs, for example, when the consumer first clicks on content such as a media file. This avoids scenarios such as where a consumer is annoyed because a file took almost two days to download, but the rental period was only one day!

In view of the above, the content renderer 304 may be configured to ensure that expiration clocks are locally enforced. The business server 122 can be used to get more current time stamps. The business server 122 may periodically push time-stamp synchronization data to synchronize multiple client devices owned by a consumer. While this may provide a positive offline experience for the consumer, the content browser may be hardened to prevent consumers from tampering with expiration dates.

Figure 8:
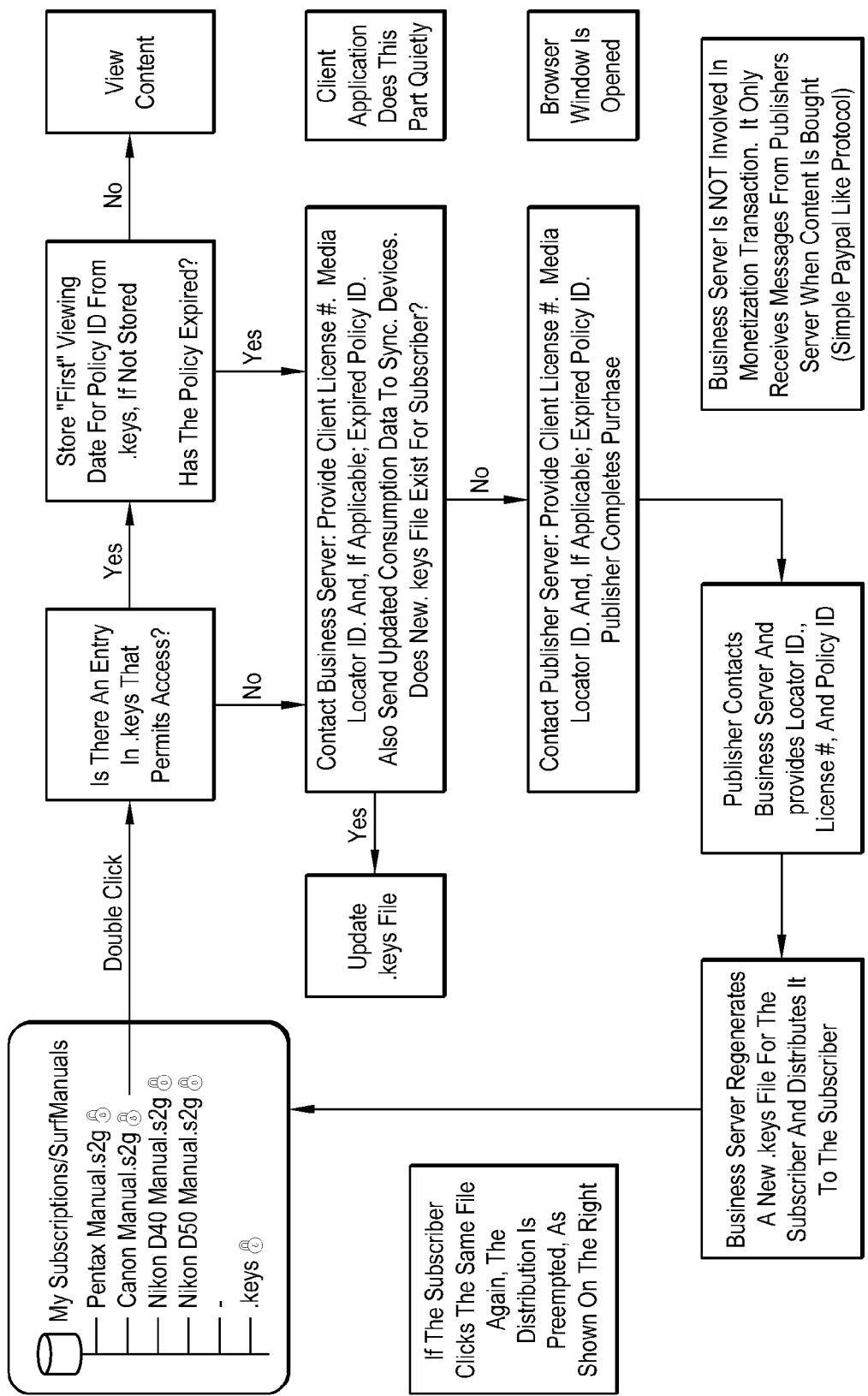
FIG. 8 shows an illustrative example of a method for distributing media keys.

FIG. 8 shows an illustrative example of a method for distributing media keys. Media keys may also be pushed periodically from the business server 122 to the client devices 118A, 118B; however, provisions can made to direct the client devices 118A, 118B back to the publisher's 120 website when content needs to be purchased or licensed prior to rendering. In FIG. 8, encrypted content and effective access lists for content are delivered to the client device 104A (or the client device 104B, or other client device). When a media key is not available to view or consume a selected piece of content, the content renderer 304 may attempt to download the media keys from the business server 122. The content renderer 304 may also direct the consumer to the publisher's 120 website for purchasing the content policies (e.g., a license). In the illustrated embodiment, the .keys file name is used for illustrative purpose only. In general, media keys and/or other keys represented by the .keys filename in FIG. 8 may be stored encrypted inside databases on the client device 104A (or 104B). Alternately or additionally, the databases may be encrypted.

Some embodiments described herein may also harden the content renderer 304 by configuring the content renderer 304 and/or use the operating system to protect:

1. File-level copies of application, effective access file, and encrypted content from one device to another.
2. Attempts to extract the media keys and the private key from a client device.
3. Attempts to extract the decrypted content from memory during content rendering.
4. Key cracking attempts on the content itself and one the effective access file.
5. Replay attacks to divert communications to rogue devices.
6. DNS spoofing.
7. Software emulation of client devices to gain access to transient data.

Some embodiments disclosed herein can tie content to client devices using one or more of a license number, hardware descriptor, or the like. The hardware descriptor (e.g., a hardware fingerprint) can be used to generate the public/private key for the client device. The client device may thus be tied to the content and the client device, when authenticated, may be able to consume the content according to the effective access list.

Security afforded by some embodiments disclosed herein can be applied more broadly than a client device. In this sense, the security may not be file-based, but may instead be ecosystem based. For example, the content can be distributed to client devices in a domain or the like.

In another example, embodiments disclosed herein can be applied to revision control. The revision control can be used to determine the rights of various client devices. In other words, for certain content (e.g., a document), the revision control can be tied to different client devices associated with different consumers. One client device may have read/write access. Another client device may have read only access. Another client device may have read/write/print access. Each of these rights can be included in the effective access list of each client device. In another example, the ability of the various client devices to write can be based on time. This can ensure, for example, that only one client device at a time has the ability to edit the content. Further, the policies can be used for revision control, collaboration, and the like.

In addition, the analytics generated from the aggregated content can be implemented in revision control as well as in editing. The aggregated content in revision control may identify, for example, which client device was used to revise content as well as identify how the content was revised, or the like.

Figure 9:
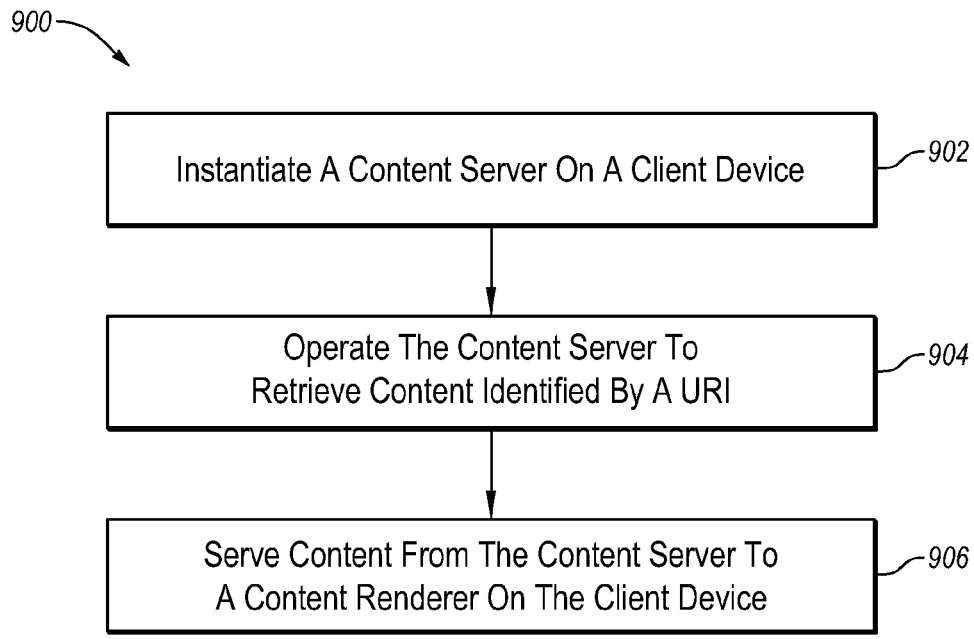
FIG. 9 shows an example flow diagram of a method of securing content.

FIG. 9 shows an example flow diagram of a method 900 of securing content. The method 900 may be performed in whole or in part by, e.g., any one of the client devices 104A, 104B associated with consumers 118A, 118B. The method 900 includes various operations, functions or actions as illustrated by one or more of blocks 902, 904 and/or 906.

In block 904, a content server is instantiated on a client device.

In block 906, the content server is operated to retrieve content identified by a URI.

In block 908, content is served from the content server to a content renderer on the client device. The content renderer may be configured to render the content at the client device and to prohibit saving the content in the clear on the client device. The content server may be configured in some embodiments to prohibit serving the content to any client except the client device including the content renderer on the same client device as the content server.

The content renderer may include any one of multiple content renderers, each configured to render a different type of content and each configured to prohibit saving the content in the clear on the client device. The different type of content corresponding to each of the multiple content renderers may include document files, image files, audio files, or video files.

Some embodiments disclosed herein include a computer-readable storage medium having computer-executable instructions stored thereon that are executable by a computing device to perform operations included in the method 900 of FIG. 9, such as the operations illustrated by blocks 902, 904 and/or 906 in FIG. 9, and/or variations thereof. The computer-readable storage medium may be included in the client device and may include, for instance, the memory 402 of FIG. 4A. The computing device may include the client device and/or a processing device thereof, such as any one of the client devices 104A, 104B, and/or the processing device 404 of FIG. 4A.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 900 may further include launching the content renderer. Launching the content renderer may include launching the content renderer as a thread separate from the content server. Alternately or additionally, launching the content renderer may include loading a viewer library corresponding to the content renderer on the client device.

In some embodiments, the method 900 may further include performing an authentication handshake between the content renderer and the content server prior to serving the content to the content renderer. Performing the authentication handshake may include deriving a session token from a shared key established between the content server and the content renderer when the content server and the content renderer are two threads derived from the same process. Alternately, performing the authentication handshake may include authenticating the content renderer and the content server using a shared key embedded at compile time or in preferences of the client device. Alternately, performing the authentication handshake may include encrypting content served from the content server to the content renderer using a public key corresponding to a private key associated with the content renderer. Alternately, performing the authentication handshake may include calculating a one-way hash of the content renderer and verifying that the one-way hash corresponds to an approved one-way hash associated with a particular type of approved content renderers. Alternately, performing the authentication handshake may include inspecting a digital signature embedded inside the content renderer.

In some embodiments, the method 900 may further include installing a policy engine on the client device. In these and other embodiments, the content retrieved by the content server may include one or more associated policies that govern consumption of the content and the policy engine may be configured to enforce the policies. Alternately or additionally, the method 900 may further include serving the content to the content renderer in accordance with the one or more associated policies.

In some embodiments in which the content renderer is any one of multiple content renderers configured to render different types of content, the method 900 may further include, prior to serving content to any of the multiple content renderers, verifying an identity of the corresponding content renderer. Verifying an identity of the corresponding content renderer may include performing an authentication handshake between the corresponding content renderer and the content server, or authenticating the corresponding content renderer by a digital signature thereof.

Figure 10:
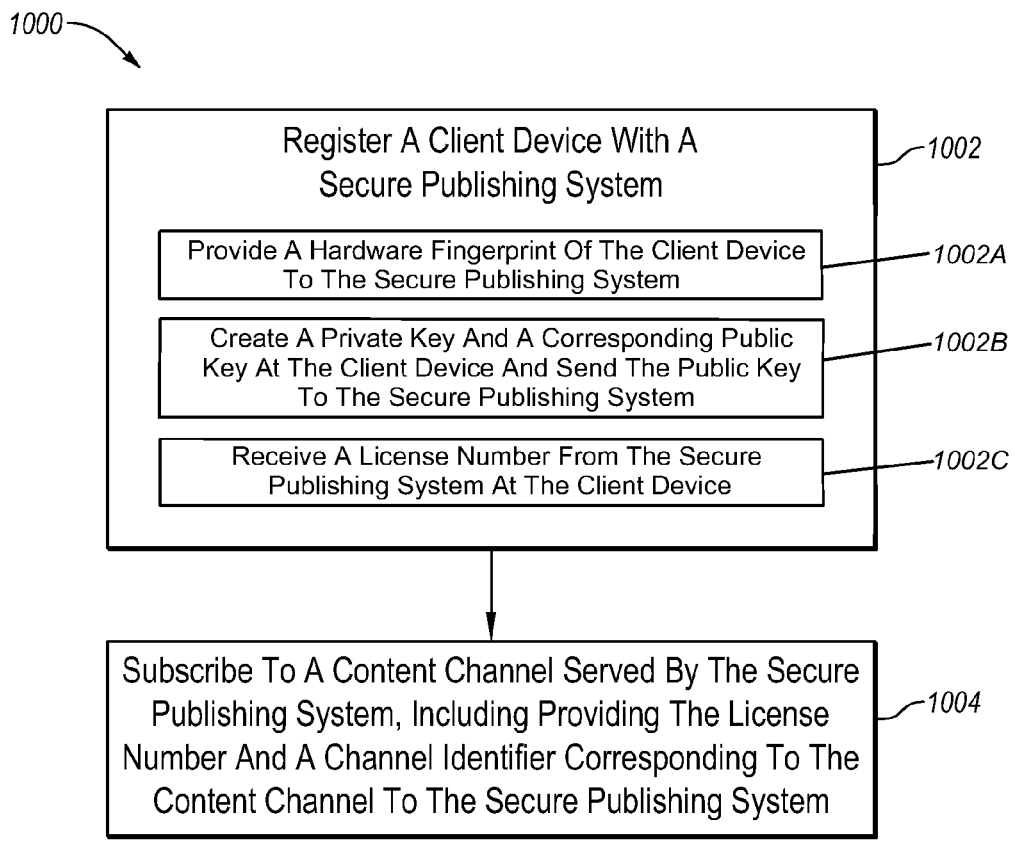
FIG. 10 shows an example flow diagram of a method of subscribing to content from one or more publishers.

FIG. 10 shows an example flow diagram of a method 1000 of subscribing to content from one or more publishers. The method 1000 may be performed in whole or in part by, e.g., any one of the client devices 104A, 104B associated with consumers 118A, 118B. The method 1000 includes various operations, functions or actions as illustrated by one or more of blocks 1002 and/or 1004.

In block 1002, a client device is registered with a secure publishing system. Registering the client device with the secure publishing system may include performing one or more of sub-blocks 1002A and 1002B.

In sub-block 1002A, a hash or a derivative of a hardware fingerprint of the client device is provided to the secure publishing system.

In sub-block 1002B, a private key and a corresponding public key are created at the client device and the public key is sent to the secure publishing system.

In sub-block 1002C, a license number is received from the secure publishing system at the client device. The license number may be generated by the secure publishing system and may be configured to uniquely identify the client device.

In block 1004, a content channel served by the secure publishing system is subscribed to. Subscribing to the content channel may include providing the license number and a channel identifier corresponding to the content channel to the secure publishing system.

In some embodiments, the client device may be registered with the secure publishing system in response to a software package including the client renderer being installed on the client device. Instructions and links for installing the software package may be provided to a consumer associated with the client device via email or on a website of the publisher of content distributed through the content channel. Information about a location of the secure publishing system and one or more content channels supported by the secure publishing system may be embedded inside a subscription file that can be processed by the content renderer or other component of the software package. The subscription file or a link to the subscription file may be emailed to the user and/or may be available to the user on a website.

In some embodiments, the method 1000 may further include the client renderer rendering, at the client device, content distributed by the secure publishing system through the content channel in accordance with one or more policies associated with the content. Rendering the content in accordance with the one or more policies may include the client renderer rendering the content only after other content is rendered first. Alternately, rendering the content in accordance with the one or more policies may include the client renderer rendering the content at a second time subsequent to a first time at which the content is received from the secure publishing system through the content channel, where the second time occurs only after receiving a media key for decrypting the content.

In these and other embodiments, the client renderer may render the content at a first time and the one or more policies may specify time-dependent rendering rights for the content Alternately or additionally, the method 1000 may further include the client renderer determining at a second time that the time-dependent rendering rights have expired and requesting renewed access to the content from the publisher.

Requesting renewed access to the content may include the client renderer providing the license number to the publisher. In response, the publisher may send instructions to the secure publishing system to update the policy without authenticating a consumer associated with the client device. In response to receiving the instructions, the secure publishing system may send the client renderer the updated policy. Accordingly, the method 1000 may further include the client renderer receiving, from the secure publishing system, the updated policy and the client renderer rendering, at the client device, the content in accordance with the updated policy.

Alternately or additionally, requesting renewed access to the content from the publisher may include the client renderer requesting, from the secure publishing system, a storefront URL of the publisher; the client renderer receiving the storefront URL from the secure publishing system; the client renderer constructing a modified URL based on the storefront URL, the license number, a first identifier associated with the content channel through which the content was distributed, and a second identifier associated with the content; and the client renderer launching a browser to the modified URL such that the license number and first and second identifiers are provided to the publisher.

In these and other embodiments, the method 1000 may further include connecting the client device directly to a website of the publisher using the modified URL, where the publisher queries an asset management system of the publisher to determine at least one of pricing or authorization information for the content. The method 1000 may additionally include displaying, at the client device, one or more purchasing or authorization options regarding the content. The method 1000 may further include receiving, at the client device, user input representing a user selection of one of the one or more purchasing or authorization options. The user selection may be communicated to the website of the publisher. In response to receiving the user selection, the publisher may send instructions to the secure publishing system to update a policy associated with the content. The secure publishing system may receive the instructions from the publisher, update the policy, and send the updated policy at the client device. The method 1000 may further include receiving, at the client device, the updated policy. The method 1000 may further include the client renderer rendering, at the client device, the content in accordance with the updated policy.

Figure 11:
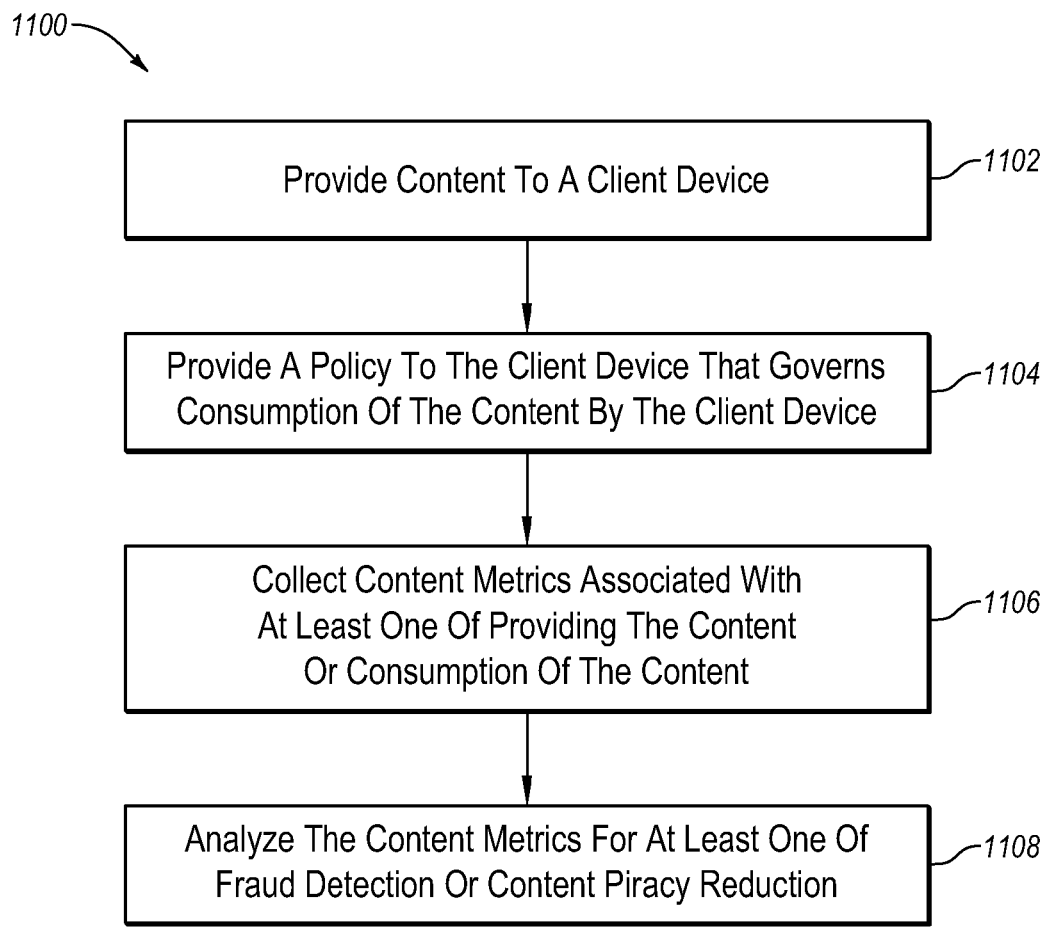
FIG. 11 shows an example flow diagram of a method of aggregating content metrics.

FIG. 11 shows an example flow diagram of a method 1100 of aggregating content metrics. The method 1100 may be performed in whole or in part by, e.g., the secure publishing system 110. The method 1100 includes various operations, functions or actions as illustrated by one or more of blocks 1102, 1104, 1106 and/or 1108.

In block 1102, content is provided to a client device.

In block 1104, a policy is provided to the client device that governs consumption of the content by the client device.

In block 1106, content metrics are collected that are associated with at least one of providing the content or consumption of the content.

In block 1108, the content metrics are analyzed for at least one of fraud detection or content piracy reduction.

In some embodiments, the content metrics may include consumption data associated with consumption of the content at the client device. In these and other embodiments, the method 1100 may further include determining, based on analyzing the metrics, that consumption of the content has been fraudulently lowered. The method 1100 may further include synching the client device with the secure publishing system to substitute previous consumption data collected from the client device by the secure publishing system for subsequent consumption data for subsequent consumption data reported by the client device that indicates lower consumption than the previous consumption data.

In some embodiments, the content metrics include consumption data including a number of times the content is rendered at the client device. In these and other embodiments, the client device may be a first client device having a unique identifier. The policy may specify a maximum number of times that content can be rendered at any client device based on a corresponding unique identifier. As such, when implemented in connection with collecting metrics, a maximum number of clone devices having the same unique identifier as the first client device that can view the content is limited by the policy.

In some embodiments, the content metrics include consumption data including a number of times the content is downloaded and an identifier associated with each client device that downloads the content. In these and other embodiments, the method 1100 may further include determining, based on the number of times the content is downloaded in association with a particular identifier, that the client device associated with the particular identifier has been cloned. The method 1100 may further include disabling access rights to all content subscribed to using the particular identifier.

Alternately or additionally, the method 1100 may further include, prior to providing the content to the client device, applying a watermark to the content. The watermark may include an identifier associated with the client device, such as a license number assigned to the client device. The method 1100 may further include, in response to identifying an unauthorized copy of the content, analyzing the unauthorized copy to identify the watermark and the corresponding client device as a source of a leak of the unauthorized copy. The method 1100 may further include at least one of suspending distribution of additional content to the client device, or revoking access rights of the client device to content previously distributed to the client device.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of subscribing to content from one or more publishers, the method comprising:
    registering a client device with a secure publishing system in response to a client renderer being installed on the client device, including:
        providing a hardware fingerprint of the client device to the secure publishing system;
        creating a private key and a corresponding public key at the client device and sending the public key to the secure publishing system, the public key utilized by the secure publishing system for encrypting communications to the client device; and receiving a license number from the secure publishing system at the client device, wherein the license number is generated by the secure publishing system and is configured to uniquely identify the client device in place of the hardware fingerprint;

subscribing to a content channel served by the secure publishing system, including providing the license number and a channel identifier corresponding to the content channel to the secure publishing system; and subsequently, the client renderer requesting renewed access from the publisher to content distributed by the secure publishing system through the content channel in response to expiration of time-dependent rendering rights for the content, wherein the client renderer requesting renewed access to the content comprises:

the client renderer requesting, from the secure publishing system, a Uniform Resource Locator (URL) of the publisher;

the client renderer receiving the URL from the secure publishing system;

the client renderer constructing a modified URL that includes the URL, the license number, a first identifier associated with the content channel through which the content was distributed, and a second identifier associated with the content; and the client renderer launching a browser to the modified URL such that the license number and first and second identifiers are provided to the publisher.

2. The method of claim 1, wherein the secure publishing system:

is hosted by a publisher of content distributed through the content channel; or is rented by the publisher and is deployed in a Software-as-a-Service (SaaS) environment.

3. The method of claim 1, wherein the client renderer is installed on the client device as part of a software package that is installed on the client device.

4. The method of claim 3, wherein instructions and links for installing the software package are provided to a consumer associated with the client device via email or on a website of a publisher of content distributed through the content channel.

5. The method of claim 1, wherein information about a location of the secure publishing system and one or more content channels supported by the secure publishing system is embedded inside a subscription file that can be processed by the content renderer.

6. The method of claim 5, wherein the subscription file or a link to the subscription file is emailed to the user or is available to the user on a website.

7. The method of claim 1, further comprising the client renderer rendering, at the client device, the content distributed by the secure publishing system through the content channel in accordance with one or more policies associated with the content.

8. The method of claim 7, wherein the client renderer renders the content at a first time and the one or more policies specify the time-dependent rendering rights for the content, the method further comprising, prior to the client renderer requesting renewed access to the content, the client renderer determining at a second time that the time-dependent rendering rights have expired.

9. The method of claim 8, wherein the client renderer requesting renewed access to the content from the publisher includes the client renderer providing the license number to the publisher.

10. The method of claim 9, further comprising:

the client renderer receiving, from the secure publishing system, an updated policy; and the client renderer rendering, at the client device, the content in accordance with the updated policy, wherein:

the secure publishing system sends the client renderer the updated policy in response to receiving corresponding instructions from the publisher; and the publisher responds to the request for renewed access received from the client renderer and sends the corresponding instructions to the secure publishing system without authenticating a consumer associated with the client device.

11. The method of claim 1, further comprising:

connecting the client device directly to a website of the publisher using the modified URL, wherein the publisher queries an asset management system of the publisher to determine at least one of pricing or authorization information for the content;

displaying, at the client device, one or more purchasing or authorization options regarding the content;

receiving, at the client device, user input representing a user selection of one of the one or more purchasing or authorization options, the user selection being communicated to the website of the publisher, wherein:

in response to receiving the user selection, the publisher sends instructions to the secure publishing system to update a policy associated with the content; and the secure publishing system receives the instructions from the publisher, updates the policy, and sends the updated policy to the client device;

receiving, at the client device, the updated policy; and the client renderer rendering, at the client device, the content in accordance with the updated policy.

12. The method of claim 7, wherein the client renderer rendering content in accordance with one or more policies associated with the content includes at least one of:

the client renderer rendering the content only after other content is rendered first; or the client renderer rendering the content at a second time subsequent to a first time at which the content is received from the secure publishing system through the content channel, wherein the second time occurs only after receiving a media key for decrypting the content.

13. A method of subscribing to content from one or more publishers, the method comprising:

registering a client device with a secure publishing system in response to a client renderer being installed on the client device, including:

providing a hardware fingerprint of the client device to the secure publishing system;

creating a private key and a corresponding public key at the client device and sending the public key to the secure publishing system, the public key utilized by the secure publishing system for encrypting communications to the client device; and receiving a license number from the secure publishing system at the client device, wherein the license number is generated by the secure publishing system and is configured to uniquely identify the client device in place of the hardware fingerprint;

subscribing to a content channel served by the secure publishing system, including providing the license number and a channel identifier corresponding to the content channel to the secure publishing system;

forwarding to the secure publishing system content consumption information for at least one of detecting fraud, detecting piracy, and generating information for marketing; and subsequently, the client renderer requesting renewed access from the publisher to content distributed by the secure publishing system through the content channel in response to expiration of time-dependent rendering rights for the content, wherein the client renderer requesting renewed access to the content comprises:

the client renderer requesting, from the secure publishing system, a Uniform Resource Locator (URL) of the publisher;

the client renderer receiving the URL from the secure publishing system;

the client renderer constructing a modified URL that includes the URL, the license number, a first identifier associated with the content channel through which the content was distributed, and a second identifier associated with the content; and the client renderer launching a browser to the modified URL such that the license number and first and second identifiers are provided to the publisher.

14. A non-transitory computer-readable medium having computer-executable instructions stored thereon that when executed by a processing device perform operations comprising:

registering a client device with a secure publishing system in response to a client renderer being installed on the client device, including:

providing a hardware fingerprint of the client device to the secure publishing system;

creating a private key and a corresponding public key at the client device and sending the public key to the secure publishing system, the public key utilized by the secure publishing system for encrypting communications to the client device; and receiving a license number from the secure publishing system at the client device, wherein the license number is generated by the secure publishing system and is configured to uniquely identify the client device in place of the hardware fingerprint;

subscribing to a content channel served by the secure publishing system, including providing the license number and a channel identifier corresponding to the content channel to the secure publishing system; and subsequently, executing the client renderer to request renewed access from the publisher to content distributed by the secure publishing system through the content channel in response to expiration of time-dependent rendering rights for the content, wherein executing the client renderer to request renewed access to the content comprises:

the client renderer requesting, from the secure publishing system, a Uniform Resource Locator (URL) of the publisher;

the client renderer receiving the URL from the secure publishing system;

the client renderer constructing a modified URL that includes the URL, the license number, a first identifier associated with the content channel through which the content was distributed, and a second identifier associated with the content; and the client renderer launching a browser to the modified URL such that the license number and first and second identifiers are provided to the publisher.

15. The non-transitory computer-readable medium of claim 14, wherein the secure publishing system:

is hosted by a publisher of content distributed through the content channel; or is rented by the publisher and is deployed in a Software-as-a-Service (SaaS) environment.

16. The non-transitory computer-readable medium of claim 14, wherein the client renderer is installed on the client device as part of a software package that is installed on the client device.

17. The non-transitory computer-readable medium of claim 14, wherein the operations further comprise executing the client renderer to render, at the client device, the content distributed by the secure publishing system through the content channel in accordance with one or more policies associated with the content.

18. The non-transitory computer-readable medium of claim 17, wherein the content is rendered at a first time and the one or more policies specify the time-dependent rendering rights for the content, the operations further comprising, prior to the request for renewed access to the content, determining at a second time that the time-dependent rendering rights have expired.

19. The non-transitory computer-readable medium of claim 17, wherein executing the client renderer to render content in accordance with one or more policies associated with the content includes at least one of:

rendering the content only after other content is rendered first; or rendering the content at a second time subsequent to a first time at which the content is received from the secure publishing system through the content channel, wherein the second time occurs only after receiving a media key for decrypting the content.

20. The non-transitory computer-readable medium of claim 14, wherein the operations further comprise:

connecting the client device directly to a website of the publisher using the modified URL, wherein the publisher queries an asset management system of the publisher to determine at least one of pricing or authorization information for the content;

displaying, at the client device, one or more purchasing or authorization options regarding the content;

receiving, at the client device, user input representing a user selection of one of the one or more purchasing or authorization options, the user selection being communicated to the website of the publisher, wherein:

in response to receiving the user selection, the publisher sends instructions to the secure publishing system to update a policy associated with the content; and the secure publishing system receives the instructions from the publisher, updates the policy, and sends the updated policy to the client device;

receiving, at the client device, the updated policy; and the client renderer rendering, at the client device, the content in accordance with the updated policy.

* * * * *